(12) United States Patent
Watanabe et al.

(10) Patent No.: US 9,197,698 B2
(45) Date of Patent: *Nov. 24, 2015

(54) MANAGEMENT COMPUTER, RESOURCE MANAGEMENT METHOD, RESOURCE MANAGEMENT COMPUTER PROGRAM, RECORDING MEDIUM, AND INFORMATION PROCESSING SYSTEM

(75) Inventors: Kentaro Watanabe, Yokohama (JP); Kiminori Sugauchi, Yokohama (JP); Hideharu Kato, San Jose, CA (US)

(73) Assignee: Hitachi, Ltd., Tokyo (JP)

(*) Notice: Subject to any disclaimer, the term of this patent is extended or adjusted under 35 U.S.C. 154(b) by 940 days.

This patent is subject to a terminal disclaimer.

(21) Appl. No.: 13/408,495

(22) Filed: Feb. 29, 2012

(65) Prior Publication Data

US 2012/0166649 A1   Jun. 28, 2012

Related U.S. Application Data

(63) Continuation of application No. 12/558,866, filed on Sep. 14, 2009, now Pat. No. 8,131,855.

(30) Foreign Application Priority Data

Jun. 4, 2009   (JP) .................................. 2009-135181

(51) Int. Cl.
   *G06F 15/16*   (2006.01)
   *H04L 29/08*   (2006.01)
   *G06F 9/50*    (2006.01)

(52) U.S. Cl.
   CPC .......... *H04L 67/1002* (2013.01); *G06F 9/5077* (2013.01); *G06F 2209/5011* (2013.01)

(58) Field of Classification Search
   CPC .............. G06F 11/008; G06F 11/3409; G06F 11/3452; G06F 2201/815; G06F 2209/5011; H04L 41/147; H04L 41/22

USPC ................................. 709/223–224, 226, 220
See application file for complete search history.

(56) References Cited

U.S. PATENT DOCUMENTS

| | | | |
|---|---|---|---|
| 4,949,254 A | 8/1990 | Shorter | |
| 2005/0172040 A1 | 8/2005 | Hashimoto | |
| 2007/0233838 A1 | 10/2007 | Takamoto et al. | |
| 2009/0300173 A1* | 12/2009 | Bakman et al. | ............... 709/224 |

FOREIGN PATENT DOCUMENTS

| | | |
|---|---|---|
| JP | 02-122363 | 5/1990 |
| JP | 2005222123 | 8/2005 |
| JP | 2007-272263 | 10/2007 |

OTHER PUBLICATIONS

Japanese Office Action dated Sep. 24, 2012, issued in corresponding Japanese Patent Application No. 2009-135181.
http:///www.vmware.com/files/jp/pdf/vi3_35_25_u2_resource_mgmt_ja.pdf> VMware, inc "resource management guide", online, Apr. 17, 2009.

* cited by examiner

*Primary Examiner* — David Lazaro
(74) *Attorney, Agent, or Firm* — Brundidge & Stanger, P.C.

(57) ABSTRACT

A resource management method executed by an information processing system having a plurality of physical servers 104 and a plurality of virtual servers 120 to be operated on the physical server, and a management server 101 connected to the physical server via a network 207 to specify the virtual server associated to a resource pool 130 and the physical server for operating the virtual server, collect performance information of the specified physical server, and calculate the performance information of the resource pool on the basis of the collected performance information.

18 Claims, 23 Drawing Sheets

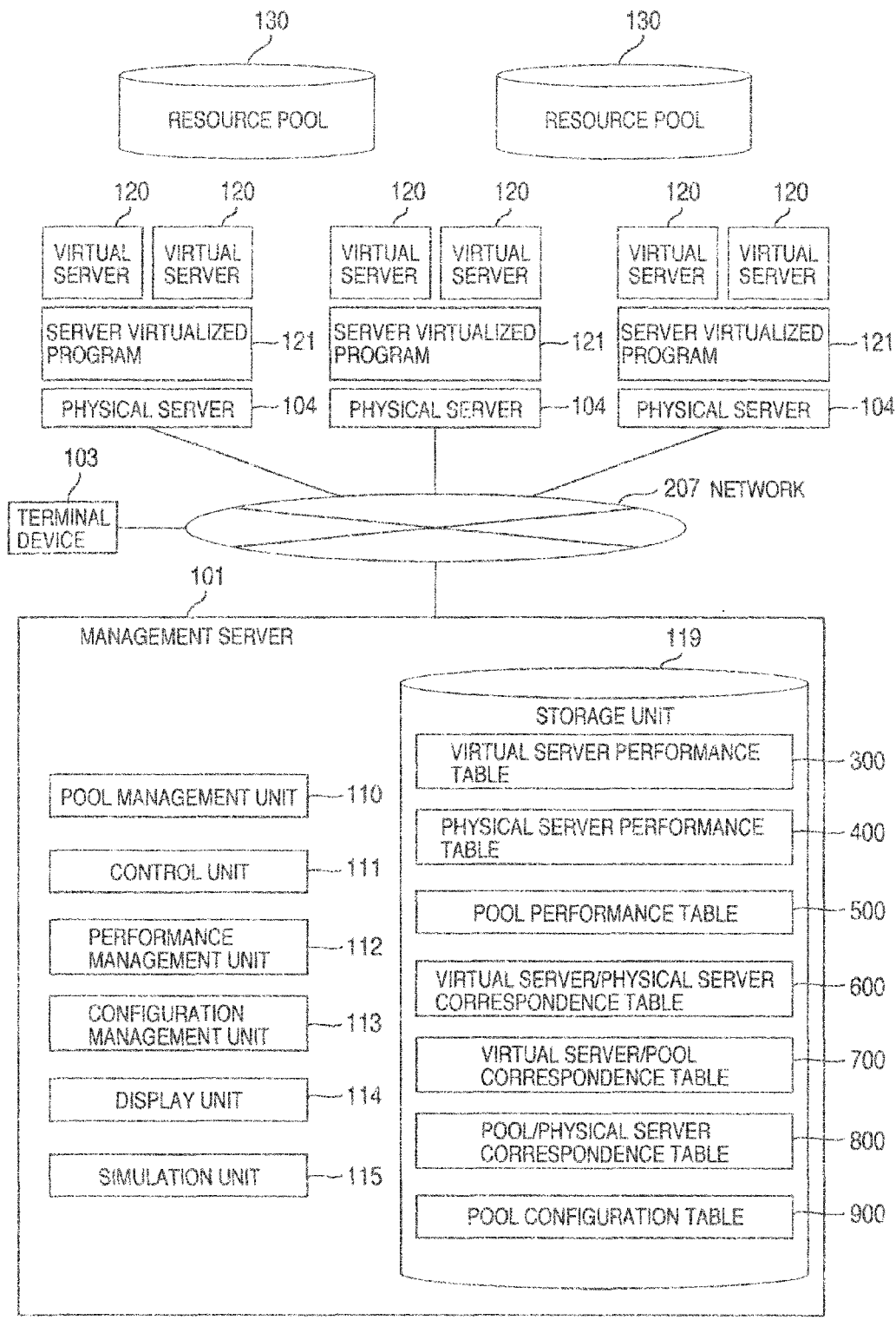

FIG.2

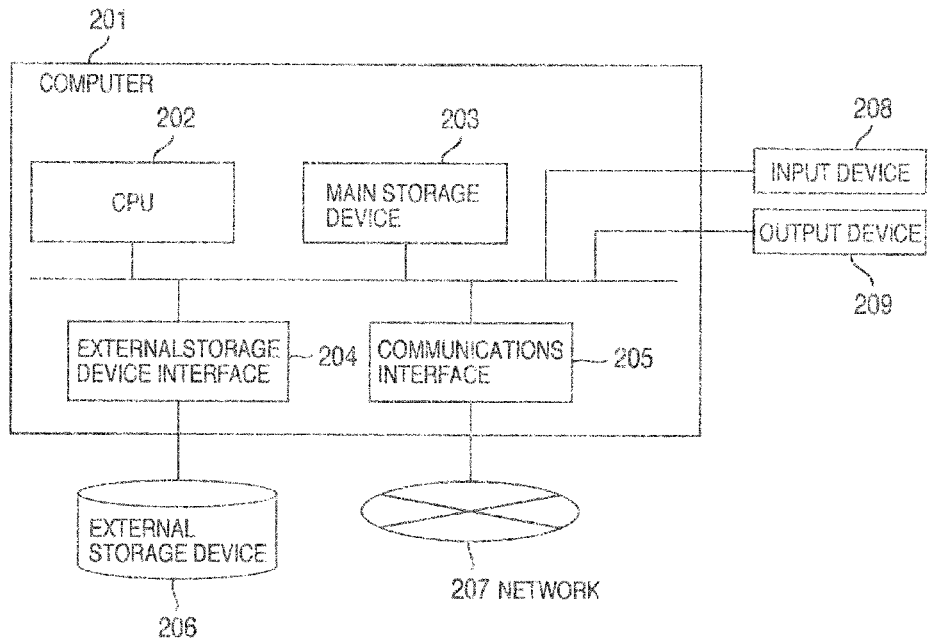

FIG.3

300 VIRTUAL SERVER PERFORMANCE TABLE

| 301 VIRTUAL SERVER ID COLUMN | 302 CPU ALLOCATION AMOUNT COLUMN | 303 CPU ALLOCATION SHORTAGE AMOUNT COLUMN | 304 CPU ALLOCATION UPPER LIMIT COLUMN | 305 CPU ALLOCATION RESERVATION COLUMN | 306 CPU ALLOCATION WEIGHT COLUMN |
|---|---|---|---|---|---|
| VIRTUAL SERVER A | 200MHz | 0MHz | n/a | n/a | 1000 |
| VIRTUAL SERVER B | 400MHz | 0MHz | n/a | n/a | 1000 |
| VIRTUAL SERVER C | 700MHz | 0MHz | n/a | n/a | 1000 |
| VIRTUAL SERVER D | 800MHz | 0MHz | n/a | n/a | 1000 |
| VIRTUAL SERVER E | 1.2GHz | 0MHz | n/a | n/a | 1000 |
| VIRTUAL SERVER F | 1.2GHz | 0MHz | n/a | n/a | 1000 |

FIG.4

400 PHYSICAL SERVER PERFORMANCE TABLE

| PHYSICAL SERVER ID COLUMN (401) | CPU TOTAL COLUMN (402) | CPU USAGE COLUMN (403) | CPU FREE COLUMN (404) |
|---|---|---|---|
| PHYSICAL SERVER A | 1GHz | 600MHz | 400MHz |
| PHYSICAL SERVER B | 2GHz | 1.5GHz | 500MHz |
| PHYSICAL SERVER C | 1.5GHz | 1.2GHz | 300MHz |
| PHYSICAL SERVER D | 1.5GHz | 1.2GHz | 300MHz |

FIG.5

500 POOL PERFORMANCE TABLE

| POOL ID COLUMN (501) | CPU ALLOCATION TOTAL COLUMN (502) | CPU ALLOCATION USAGE COLUMN (503) | CPU ALLOCATION FREE COLUMN (504) | CPU ALLOCATION UPPER LIMIT COLUMN (505) | CPU ALLOCATION RESERVATION COLUMN (506) | CPU ALLOCATION WEIGHT COLUMN (507) |
|---|---|---|---|---|---|---|
| POOL A | 1.5GHz | 900MHz | 600MHz | n/a | n/a | 1000 |
| POOL B | 1.5GHz | 1.2GHz | 300MHz | n/a | n/a | 1000 |
| POOL C | 3GHz | 2.4GHz | 600MHz | 3GHz | 3GHz | 1000 |

FIG.6

600 VIRTUAL SERVER/PHYSICAL SERVER CORRESPONDENCE TABLE

| VIRTUAL SERVER COLUMN (601) | PHYSICAL SERVER COLUMN (602) |
|---|---|
| VIRTUAL SERVER A | PHYSICAL SERVER A |
| VIRTUAL SERVER B | PHYSICAL SERVER A |
| VIRTUAL SERVER C | PHYSICAL SERVER B |
| VIRTUAL SERVER D | PHYSICAL SERVER B |
| VIRTUAL SERVER E | PHYSICAL SERVER C |
| VIRTUAL SERVER F | PHYSICAL SERVER D |

FIG.7

700 VIRTUAL SERVER/POOL CORRESPONDENCE TABLE

| POOL ID COLUMN (701) | VIRTUAL SERVER ID COLUMN (702) |
|---|---|
| POOL A | VIRTUAL SERVER A |
| POOL A | VIRTUAL SERVER C |
| POOL B | VIRTUAL SERVER B |
| POOL B | VIRTUAL SERVER D |
| POOL C | VIRTUAL SERVER E |
| POOL C | VIRTUAL SERVER F |

FIG.8

800 POOL/PHYSICAL SERVER CORRESPONDENCE TABLE

| POOL ID COLUMN (801) | PHYSICAL SERVER ID COLUMN (802) | SHARE (803) |
|---|---|---|
| POOL A | PHYSICAL SERVER A | SHARE |
| POOL A | PHYSICAL SERVER B | SHARE |
| POOL B | PHYSICAL SERVER A | SHARE |
| POOL B | PHYSICAL SERVER B | SHARE |
| POOL C | PHYSICAL SERVER C | OCCUPANCY |
| POOL C | PHYSICAL SERVER D | OCCUPANCY |

FIG.9

900 POOL CONFIGURATION TABLE

| POOL ID COLUMN (901) | PHYSICAL SERVER ID COLUMN (902) |
|---|---|
| POOL A | PHYSICAL SERVER A |
| POOL A | PHYSICAL SERVER B |
| POOL B | PHYSICAL SERVER A |
| POOL B | PHYSICAL SERVER B |
| POOL C | PHYSICAL SERVER C |
| POOL C | PHYSICAL SERVER D |

FIG. 13

■ POOL INFORMATION — 1301

| POOL ID — 1311 | ENTIRETY — 1312 | USAGE — 1313 | FREE — 1314 | UPPER LIMIT — 1315 | RESERVATION — 1316 | ADDABLE VIRTUAL SERVER MAXIMUM SIZE — 1317 |
|---|---|---|---|---|---|---|
| POOL A | 5GHz | 3GHz | 2GHz | 3GHz | 3GHz | 0.5GHz |

■ VIRTUAL SERVER LIST — 1302

| VIRTUAL SERVER ID — 1321 | PHYSICAL SERVER ID — 1322 | ALLOCATION — 1323 | UPPER LIMIT — 1324 | LOWER LIMIT — 1325 | EXTENDABLE AMOUNT — 1326 |
|---|---|---|---|---|---|
| VIRTUAL SERVER A | PHYSICAL SERVER A | 0.5GHz | n/a | n/a | 0.5GHz |
| VIRTUAL SERVER B | PHYSICAL SERVER A | 0.5GHz | n/a | n/a | 0.5GHz |
| VIRTUAL SERVER C | PHYSICAL SERVER B | 0.5GHz | n/a | n/a | 0.5GHz |

■ CONFIGURATION PHYSICAL SERVER — 1303

| PHYSICAL SERVER ID — 1331 | ENTIRETY — 1332 | USAGE — 1333 | FREE — 1334 |
|---|---|---|---|
| PHYSICAL SERVER A | 1.5GHz | 1GHz | 0.5GHz |
| PHYSICAL SERVER B | 1.5GHz | 1GHz | 0.5GHz |
| PHYSICAL SERVER B | 1.5GHz | 1GHz | 0.5GHz |

OK — 1340    CANCEL — 1341

■ POOL INFORMATION — 1401

| POOL ID 1411 | ENTIRETY 1412 | USAGE 1413 | FREE 1414 | UPPER LIMIT 1415 | RESERVATION 1416 | ADDABLE VIRTUAL SERVER MAXIMUM SIZE 1417 |
|---|---|---|---|---|---|---|
| POOL A | 5GHz | 3GHz | 2GHz | 3GHz | 3GHz | 0.5GHz |
| POOL B | 5GHz | 3GHz | 2GHz | 3GHz | 3GHz | 0.5GHz |

■ VIRTUAL SERVER LIST — 1402

| VIRTUAL SERVER ID 1421 | POOL ID 1422 | PHYSICAL SERVER ID 1423 | ALLOCATION 1424 | UPPER LIMIT 1425 | LOWER LIMIT 1426 | EXTENDABLE AMOUNT 1427 |
|---|---|---|---|---|---|---|
| VIRTUAL SERVER A | POOL A | PHYSICAL SERVER A | 0.5GHz | n/a | n/a | 0.5GHz |
| VIRTUAL SERVER B | POOL A | PHYSICAL SERVER B | 0.5GHz | n/a | n/a | 0.5GHz |
| VIRTUAL SERVER C | POOL A | PHYSICAL SERVER B | 0.5GHz | n/a | n/a | 0.5GHz |
| VIRTUAL SERVER D | POOL B | PHYSICAL SERVER B | 0.5GHz | n/a | n/a | 0.5GHz |
| VIRTUAL SERVER E | POOL B | PHYSICAL SERVER B | 0.5GHz | n/a | n/a | 0.5GHz |
| VIRTUAL SERVER F | POOL B | PHYSICAL SERVER A | 0.5GHz | n/a | n/a | 0.5GHz |

■ CONFIGURATION PHYSICAL SERVER — 1403

| PHYSICAL SERVER ID 1431 | ENTIRETY 1432 | USAGE 1433 | FREE 1434 |
|---|---|---|---|
| PHYSICAL SERVER A | 1.5GHz | 1GHz | 0.5GHz |
| PHYSICAL SERVER B | 1.5GHz | 1GHz | 0.5GHz |

[ OK ] 1440   [ CANCEL ] 1441

1400

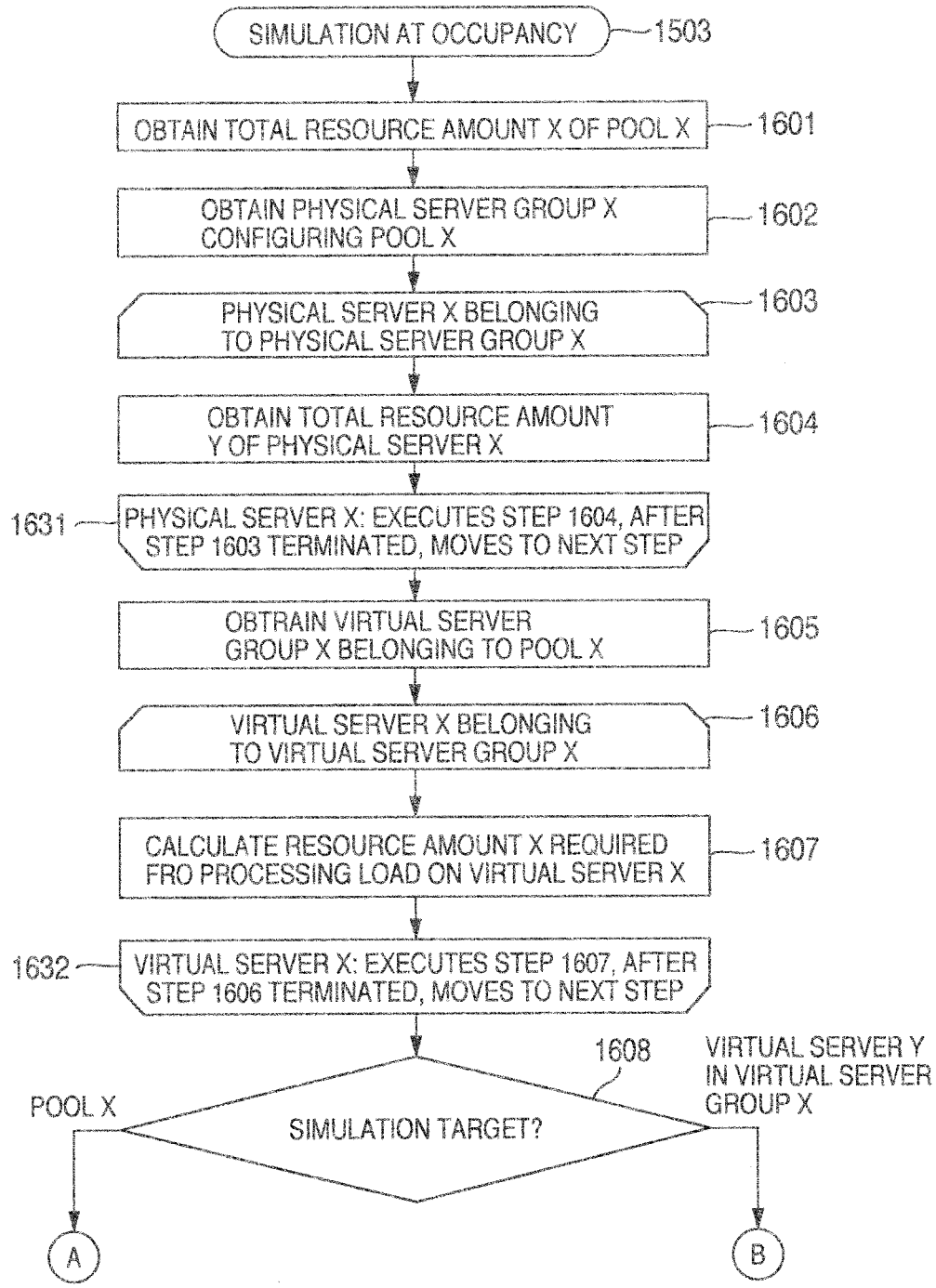

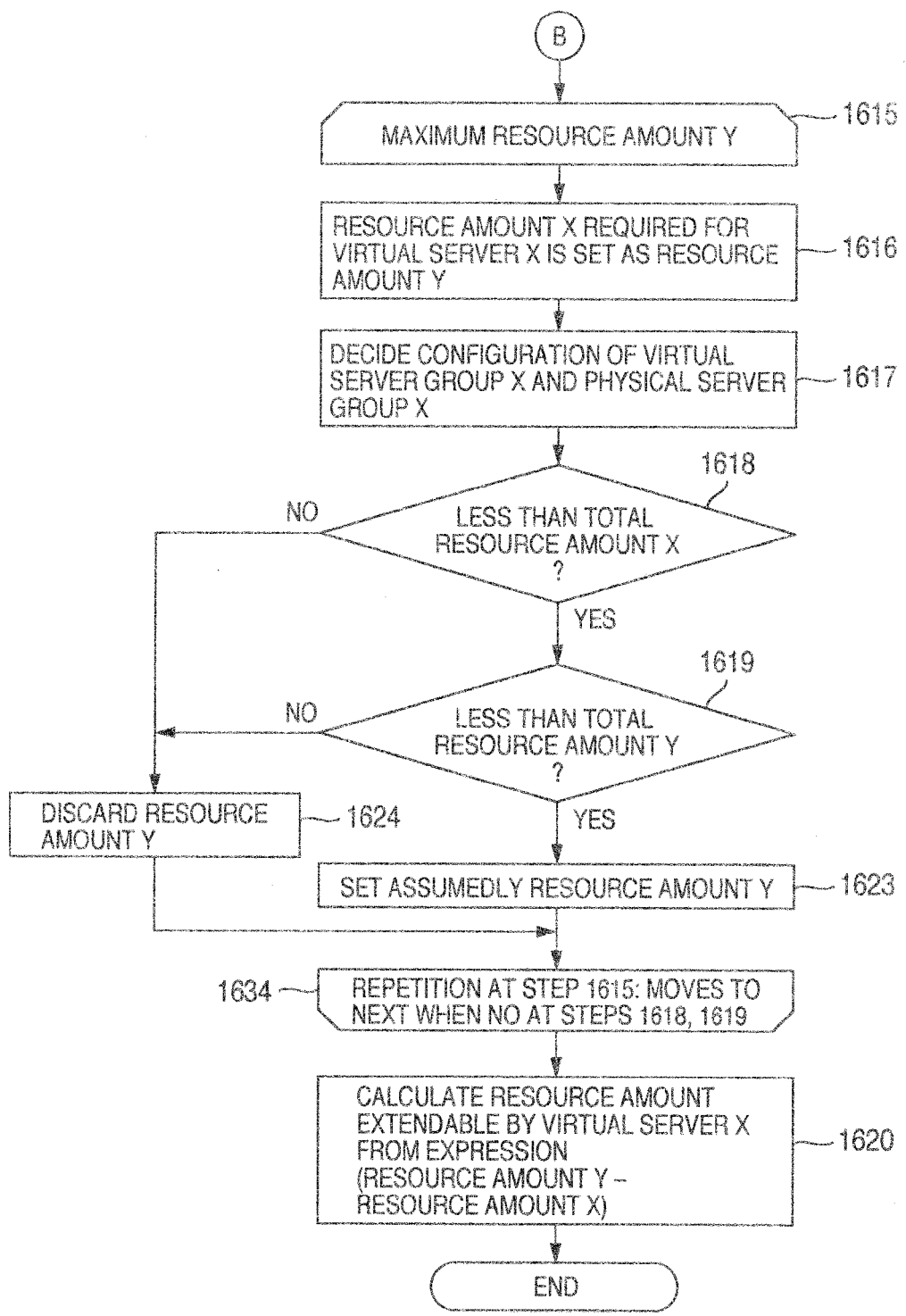

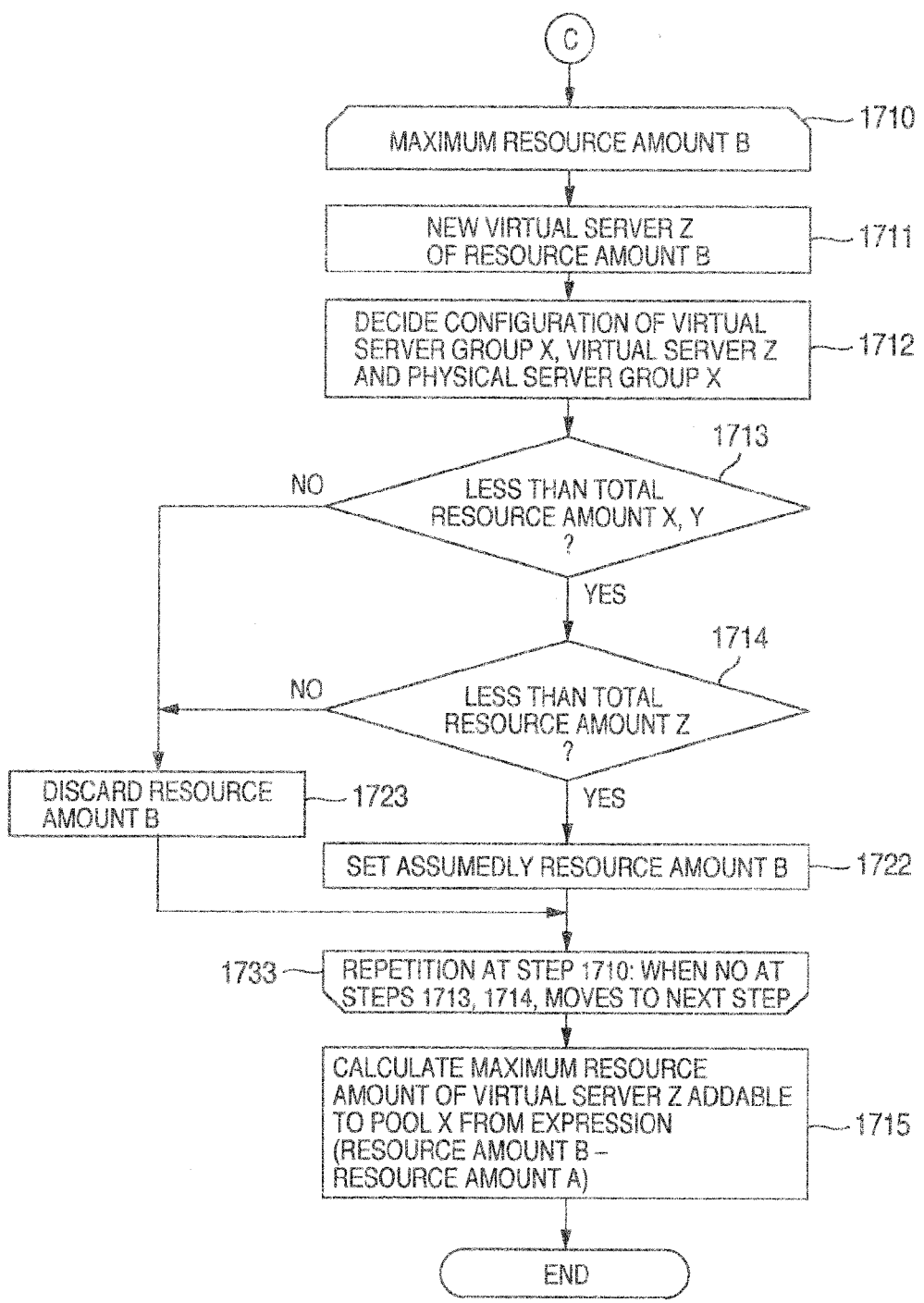

FIG.22

300 VIRTUAL SERVER PERFORMANCE TABLE

| VIRTUAL SERVER ID COLUMN | NUMBER OF ALLOCATION CORES COLUMN |
|---|---|
| VIRTUAL SERVER A | 1 |
| VIRTUAL SERVER B | 2 |
| VIRTUAL SERVER C | 1 |
| VIRTUAL SERVER D | 4 |
| VIRTUAL SERVER E | 2 |
| VIRTUAL SERVER F | 2 |

FIG.23

400 PHYSICAL SERVER PERFORMANCE TABLE

| PHYSICAL SERVER ID COLUMN | TOTAL NUMBER OF CORES COLUMN | NUMBER OF ALLOCATED CORES COLUMN | NUMBER OF NON-ALLOCATED CORES COLUMN |
|---|---|---|---|
| PHYSICAL SERVER A | 4 | 3 | 1 |
| PHYSICAL SERVER B | 6 | 5 | 1 |
| PHYSICAL SERVER C | 4 | 2 | 2 |
| PHYSICAL SERVER D | 4 | 2 | 2 |

FIG.24

500 POOL PERFORMANCE TABLE

| POOL ID COLUMN | TOTAL NUMBER OF CORES COLUMN | NUMBER OF ALLOCATED CORES COLUMN | NUMBER OF NON-ALLOCATED CORES COLUMN |
|---|---|---|---|
| POOL A | 2 | 2 | 0 |
| POOL B | 8 | 6 | 2 |
| POOL C | 8 | 4 | 4 |

MANAGEMENT COMPUTER, RESOURCE MANAGEMENT METHOD, RESOURCE MANAGEMENT COMPUTER PROGRAM, RECORDING MEDIUM, AND INFORMATION PROCESSING SYSTEM

INCORPORATION BY REFERENCE

The present application claims priority from Japanese application JP2009-135181 filed on Jun. 4, 2009 and is a continuation application of U.S. application Ser. No. 12/558,866 filed on Sep. 14, 2009, the contents of which are hereby incorporated by reference into this application.

BACKGROUND OF THE INVENTION

The present invention relates to a technique for managing computers, and in particularly to a technique for managing a plurality of computer resources.

In the field of information processing systems or datacenters in companies, the number of servers have been increased. With the above above-trend increase, an operational management cost of the servers has been increased.

In order to solve the above-mentioned problem, a technique has been known that the servers are virtualized, that is, the technique in which the server is virtualized is that a plurality of virtual servers can be operated by a single physical server. Specifically, resources such as processors (CPU: Central Processing Unit), memories, etc. provided in the physical server are divided, and these divided resources in the physical server are allocated to the plurality of virtual servers, respectively. The plurality of virtual servers are then operated by the single physical server simultaneously.

In these days, the processing performance of CPU has been progressed and the cost of resources such as memory has been come down, therefore, the demands regarding the technique of virtualizing the servers have been increased.

Further, the technique of virtualizing the servers not only provides a merit of such that the plurality of virtual servers can be operated by the single physical server, but also provides a merit of such that the resources in the physical server can be used effectively by executing a workload management using the plurality of virtual servers.

Here, the workload management means that a resource amount of the physical server, to be allocated to the virtual servers, is varied in response to a condition of a load on the physical server etc. For example, when the load on a certain virtual server becomes high, the resources of the physical server, which are allocated to a lowly load virtual server being operated in the same physical server, are allocated to a highly load virtual server. In this way, the resources of the physical server can be used effectively.

Further, in the case of using a resource pool, the resource amounts to be allocated can be managed collectively for the virtual servers which are grouped. In this way, a total resource amount allocated to the grouped virtual servers is set, and the resources of the total resource amount, which are set in between the grouped virtual servers, can be used in share. A user of the resource pool can extend the size of the virtual servers and can also newly create virtual servers within the total resource amount of the resource pool.

Further, an allocation policy of the resource to be applicable to the groups can be set. For example, the virtual server can be set in such that the resources are allocated in priority to the virtual server when the resources are competed within the virtual servers in the group. Furthermore, the resources are allocated not only to occupy the group, but also share between the groups. When competing the resources shared between the groups, the allocation policy can be set to the group such that the resources are allocated in priority to the group.

In this way, by executing the resource management of the resource pool, the resources in the plurality of physical servers can be used effectively. Such above-mentioned technique has been proposed as JP-A-2007-272263, JP-A-2-122363, and a document found on Internet <URL: http://www.vmware.com/files/jp/pdf/vi3_35_25_u2_resource_mgmt_ja.pdf> VMware, Inc "resource management guide", online, Apr. 17, 2009

SUMMARY OF THE INVENTION

In the case of the conventional resource management of the resource pool, however, the resource management desired by an administrator who executes the resource management cannot sometimes be realized, since a configuration of the resource pool and a resource usage condition are mainly monitored.

For example, a certain virtual server cannot be resided simultaneously in the plurality of physical servers in general, but must be resided in one physical server at a certain time point. A part of the resources in the plurality of physical servers cannot be divided respectively and allocated to the virtual servers. Since there is such above-mentioned physical restriction of the resources, the virtual server allocated sufficient resources cannot be created to the resource pool in the case where a free resource is short in the physical server configuring the resource pool, even though there are sufficient free resources in the resource pool. Further, when the free resource is short in the physical server, the virtual server belonging to the resource pool cannot extend the resource to be allocated up to the free resource equal to or greater than that in the physical server, even though there are sufficient free resources in the resource pool.

In this way, there is a case that the administrator cannot specify a reason that the virtual server cannot be added to the resource pool, despite the fact that there are sufficient free resources in the resource pool, and cannot also specify a reason that the virtual serve cannot secure sufficient resources. For this reason, the resource management is not easy.

The invention is made in light of the above-mentioned conditions, and an object of the invention is to provide that the resource management of the resource pool and virtual server executed by an administrator is made easily in an environment where a plurality of virtual servers associated with a certain resource pool is dispersedly arranged in a single or a plurality of physical servers.

According to an aspect of the invention, a resource management method to be executed by an information processing system including: a plurality of physical servers each having a processor to execute an arithmetic processing, a memory connected with the processor, and an interface connected with the memory; and a management computer having a plurality of virtual servers to be operated by the physical server, a processor connected with the physical server via a network to execute the arithmetic processing, a memory connected with the processor, and an interface connected with the memory, wherein the management computer provides information to be associated with the physical server and the virtual server operated by the physical server and information to manage a single or the plurality of virtual servers as a group, to specify the virtual server corresponding to the group by accepting a group designation, specify the physical server to operate the specified virtual server, collect a processing performance of the specified physical server, and calculate the processing performance of a resource pool in accordance with the collected processing performance.

According to the invention, since the resource management is provided so as to pay attention to the physical server configuring the resource pool, the administrator can specify an event occurred by causing the physical restriction of the resource, therefore, the management of resources becomes easy.

In recent years, the resource amount to be demanded by the virtual server has become large, which is close to the resource amount of the physical server. For this reason, the resource pool management, which has sufficient free resource amount, has been executed normally in a condition where the free resource amount of the physical server is very few. In the case of the above-mentioned management, it is very useful that the administrator of the resource pool becomes to be able to monitor the physical server. In the past, the resource amount has not been so large for the demands requested by the virtual servers, therefore, necessity for taking into account the physical server has been short in accordance with the administrator of the resource pool.

According to the invention, the resource management executed by the administrator for the resource pool and virtual servers can be made easily in the environment where the plurality of virtual servers associated with a certain resource pool are arranged dispersedly in the single or plurality of physical servers.

The other objects, features and advantages of the invention will become apparent from the following description of the embodiments of the invention taken in conjunction with the accompanying drawings.

BRIEF DESCRIPTION OF THE DRAWINGS

FIG. 1 is a configuration diagram showing an information processing system in a first embodiment of the invention;

FIG. 2 is a hardware configuration diagram of the information processing system;

FIG. 3 is a configuration diagram of a virtual server performance table 300;

FIG. 4 is a configuration diagram of a physical server performance table 400;

FIG. 5 is a configuration diagram of a pool performance table 500;

FIG. 6 is a configuration diagram of a virtual server/physical server correspondence table 600;

FIG. 7 is a configuration diagram of a virtual server/pool correspondence table 700;

FIG. 8 is a configuration diagram of a pool/physical server correspondence table 800;

FIG. 9 is a configuration diagram of a pool configuration table 900;

FIG. 13 is a diagram showing a display screen for displaying the performance information of the resource pool 130 in the first embodiment;

FIG. 14 is a diagram showing a display screen for displaying the performance information of the resource pool 130 in the first embodiment;

FIG. 16A is a flowchart of a processing operation when the resource pool 130 occupies a physical server group;

FIG. 16C is a flowchart of a processing operation when the resource pool 130 occupies a physical server group;

FIG. 17B is a flowchart of a processing operation when the size fixed resource pool 130 shares the physical server group;

FIG. 22 is a configuration diagram showing the virtual server performance table 300 in a second embodiment of the invention;

FIG. 23 is a configuration diagram showing the physical server performance table 400 in the second embodiment of the invention; and FIG. 24 is a configuration diagram showing the pool performance table 500 in the second embodiment of the invention.

DESCRIPTION OF THE EMBODIMENTS

First Embodiment

Figure 10:
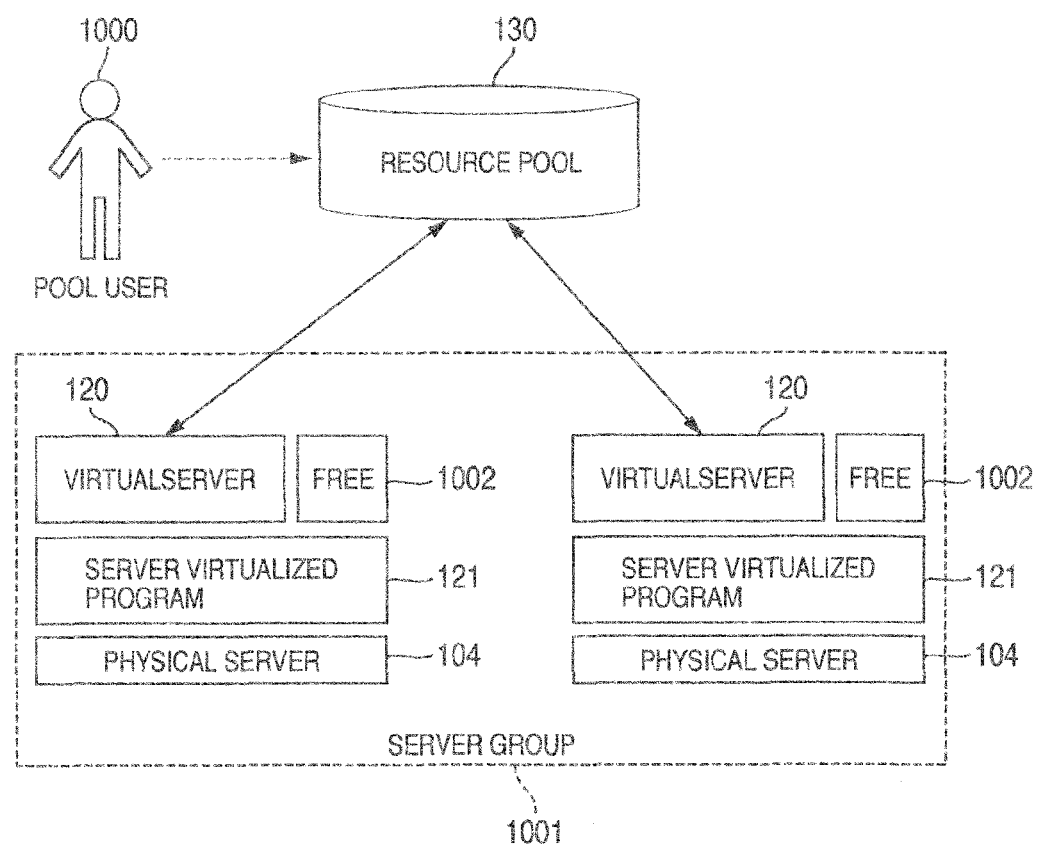
FIG. 10 is a diagram showing a resource pool management in the first embodiment of the invention.

FIG. 1 is a configuration diagram showing an information processing system in a first embodiment of the invention.

The information processing system of this embodiment provides a management server (management computer) 101, physical servers 104, and a terminal device 103.

The management server 101, physical servers 104, and terminal device 103 are connected respectively via a network 207. The physical server 104 provides a server virtualized program 121 to read out that program and execute its processing so that the virtual server 120 is operated by the physical server 104.

The management server 101, physical servers 104 and terminal device 103 are configured as a computer 201 (refer to FIG. 2).

FIG. 2 is a hardware configuration diagram showing the computer 201, an external storage device 206, the network 207, an input device 208, and an output device 209 in the information processing system.

The computer 201 provides a CPU (control device) 202, a main storage device (memory device) 203, an external storage device interface 204, and a communications interface 205. The external storage device interface 204 is connected with the external storage device (memory device) 206, and the communications interface 205 is connected with the network 207. Further, the computer 201 is connected with the input device (for example, keyboard, pointing device) 208 and the output device (display device, for example, display) 209. The management server 101 provides a console (not shown). In addition, another computer connected to the management server 101 via the network 207 may provide the console, other than the management server 101.

The computer 201 may also have a configuration provided by including the external storage device 206, input device 208, and output device 209.

The management server 101 manages and controls the physical servers 104, server virtualized programs 121, virtual servers 120, and resource pools 130. In this embodiment, the following description will be concerned with a case where the resource pool 130 is controlled from the physical servers 104 by using a dedicated program (program used for configuring the resource pool) to be executed in another computer other than the management server 101, and that computer stores the program to realize the management of the resource pool 130 by the management server 101 in accordance with a command from the management server 101. However, the management server 101 may store the program then manage the resource pool 130.

Referring back to FIG. 1, the management server 101 provides a pool management unit 110, a control unit 111, a performance management unit 112, a configuration management unit 113, a display unit 114, a simulation unit 115, and a storage unit 119.

The pool management unit 110 is a processing unit that manages the resource amount of the resource pool 130 by using various tables (300 to 900) stored in the storage unit 119, for example.

The control unit 111 is a processing unit that controls the virtual servers 120 via the server virtualized program 121.

The performance management unit 112 is a processing unit that manages performance information of the virtual servers 120, physical servers 104 and resource pools 130. The performance management unit 112 also collects the performance information via the server virtualized program 121 to record the performance information in an after-mentioned virtual server performance table 300, an after-mentioned physical server performance table 400 and an after-mentioned pool performance table 500 of the storage unit 119. Further, the performance management unit 112 reads out the performance information requested from the display unit 114 and other processing units from the virtual server performance table 300, physical server performance table 400 and pool performance table 500 to then respond to the requests.

The configuration management unit 113 is a processing unit that manages configuration information of the virtual servers 120, physical servers 104 and resource pools 130. The configuration management unit 113 collects the configuration information via the server virtualized program 121 to record, in the storage unit 119, an after-mentioned virtual server/physical server correspondence table 600, an after-mentioned virtual server/pool correspondence table 700, an after-mentioned pool/physical server correspondence table 800, and an after-mentioned pool configuration table 900. The configuration management unit 113 also reads out the configuration information requested by the display unit 114 and the other processing units from the virtual server/physical server correspondence table 600, virtual server/pool correspondence table 700, pool/physical server correspondence table 800, and pool configuration table 900 to then respond to the requests.

The display unit 114 is a processing unit that displays the performance information or configuration information of the virtual servers 120, physical servers 104, and resource pools 130 in response to the requests from the administrator who operates the management server 101.

The simulation unit 115 is a processing unit that simulates and calculates the resource amount of the virtual servers 120, physical servers 104, and resource pools 130.

The storage unit 119 is a storage area for the manage information (collective term of the performance information, configuration information, and other information necessary for the resource management to be executed by the other management server 101) of the management server 101.

The storage unit 119 provides the virtual server performance table 300, physical server performance table 400, pool performance table 500, virtual server/physical server correspondence table 600, virtual server/pool correspondence table 700, pool/physical server correspondence table 800, and pool configuration table 900. The storage unit 119 also stores temporarily or semi-permanently a processing result from the processing units in the management server 110, data obtained from the network 207, etc.

The virtual server performance table 300 is a table that stores the performance information regarding a resource allocation of the virtual servers 120 and setting information regarding the performance information.

FIG. 3 is a configuration diagram of the virtual server performance table 300. Each line indicates the performance information regarding the CPU 202 allocated to the virtual servers 120 and the setting information regarding the performance information, in which these pieces of performance information are represented respectively by a clock frequency.

In addition, the above-mentioned CPU 202 means CPU 202 provided in the physical server 104. After-mentioned "CPU 202" means a CPU provided in the physical server 104 unless otherwise explained. Likewise, the main storage device 203 and external storage device 206 are also provided in the physical server 104.

The virtual server performance table 300 provides a virtual server ID (Identifier) column 301, a CPU allocation amount column 302, a CPU allocation shortage amount column 303, a CPU allocation upper limit column 304, a CPU allocation reservation column 305, and a CPU allocation weight column 306.

The virtual server ID column 301 stores information that uniquely identifies the virtual server 120.

The CPU allocation amount column 302 stores operating clock frequencies (allocation resource amount of virtual device) of the CPU 202 allocated to the virtual servers 120 from the server virtualized program 121. The virtual server 120 is operated by the allocated operating clock frequency. The server virtualized program 121 varies the operating clock frequency to be allocated dynamically to the virtual server 120 in response to a load of the virtual server 120. For this reason, values stored in the CPU allocation amount column 302 vary sequentially.

The CPU allocation shortage amount column 303 records the operating clock frequencies (shortage resource amount of virtual device) of the CPU 202, which is not allocated to the virtual server 120 even though the virtual server 120 requested the allocation to the server virtualized program 121 in order to process the load. A value added with the CPU allocation amount and CPU allocation shortage amount is a resource amount which should have required for the allocation to the virtual server 120 in order to process the load on the virtual server 120. This CPU allocation shortage amount indicates the operating clock frequency which was not allocated to, since the resource was competed with the other virtual server 120 to be operated on the physical server 104. In addition, the CPU allocation shortage amount can be calculated by a known analysis method on the basis of the performance of physical server 104, a load amount, etc.

The CPU allocation upper limit column 304 records limit values of the operating clock frequency of the CPU 202 to be allocated to the virtual server 120. The server virtualized program 121 does not allocate the CPU allocation, which is equal to or greater than the value stored in the CPU allocation upper limit column 304, to the virtual server 120, even though the virtual server 120 requests to it. In addition, "n/a" means "not applicable" indicating that there is no corresponding value.

The CPU allocation reservation column 305 stores assurance values of the operating clock frequency of the CPU 202 to be allocated to the virtual server 120. When a request arises from the virtual server 120, the server virtualized program 121 gives assurance to the virtual server 120 in such that the operating clock frequency of the value stored in the CPU allocation reservation column 305 is allocated at least to the virtual server 120.

The CPU allocation weight column 306 stores a value of weight information to be used for adjusting the allocation amount by the server virtualized program 121, when the virtual server 120 competes with the other virtual server 120 about the CPU 202, on the physical server 104.

In this embodiment, the operating clock frequency of the CPU 202 has been used as the performance information of the virtual server 120 which is stored in the virtual server performance table 300. However, the above-mentioned example is not limited as the performance information. The performance information of the virtual server 120 may be acceptable any information if it is a resource amount allocated to the virtual server 120, such as percentage information indicating a usage condition calculated from all of clock frequencies and the operating clock frequencies of the CPU 202, an allocation capacity of the main storage device 203, an access band of the network 207, a disk capacity of the external storage device 206, an input and output band of disk access, etc. Either one or all of the above may be acceptable.

The physical server performance table 400 is a table that stores the performance information indicating a resource usage condition of the physical servers 104. Each line of the physical server performance table 400 indicates the performance information of the physical server 104.

FIG. 4 is a configuration diagram of the physical server performance table 400. Each line indicates the performance information of the CPU 202 on the physical server 104 as displayed clock frequencies.

The physical server performance table 400 provides a physical server ID column 401, a CPU total column 402, a CPU usage column 403, and a CPU free column 404.

The physical server ID column 401 indicates information for uniquely identifying the physical servers 104.

The CPU total column 402 indicates all clock frequencies of CPU 202 mounted on the physical server 104.

The CPU usage column 403 indicates the operating clock frequencies (usage resource amount of physical device) of the CPU 202 mounted on the physical server 104. A ratio of the value in the CPU usage column 403 to the value of CPU total column 402 as an entire value, is a CPU usage rate of the physical server 104. Further, a value of totalizing the CPU allocation amount (refer to a reference numeral 302) of all virtual servers 120 operated on the physical server 104 becomes the value in CPU usage column 403 of the physical server 104.

The CPU free column 404 indicates the clock frequencies (free resource amount of physical device) which were not operated in the CPU 202 mounted on the physical server 104. A value subtracted the value of CPU usage column 403 from the value of CPU total column 402 becomes a value of CPU free column 404.

In this embodiment, the information regarding the clock frequency of CPU 202 has been used as the performance information of the physical server 104 stored in the physical server performance table 400. However, the above-mentioned example is not limited as for contents and representation form of the information. Any information may be acceptable if the performance information indicates the resource usage condition of the physical server 104, such as the percentage information indicating a usage amount calculated from the clock frequency and operating clock frequency of the CPU 202, a usage capacity of the main storage device 203, the access band of the network 207, the disk capacity of the external storage device 206, the input and output band of disk access, etc. Either one or all of the above may be acceptable.

The pool performance table 500 is a table for storing the performance information indicating the usage condition of the resource pool 130 and the setting information related to the performance information.

FIG. 5 is a configuration diagram of the pool performance table 500. Each line of the pool performance table 500 indicates the performance information indicating the usage condition of the resource spool 130.

The pool performance table 500 provides a pool ID column 501, a CPU allocation total column 502, a CPU allocation usage column 503, a CPU allocation free column 504, a CPU allocation upper limit column 505, a CPU allocation reservation column 506, and a CPU allocation weight column 507.

The pool ID column 501 indicates information for uniquely identifying the resource pool 130.

The CPU allocation total column 502 indicates a total amount of the clock frequencies in the CPU 202 allocated to the resource pool 130. A user (administrator) of resource pool 130 can newly create the virtual server 120 and extend the clock frequency allocated to the virtual server 120 in a range of indicating that the total of the clock frequencies to be allocated to the virtual server 120 becomes a value less than the value of CPU allocation total column 502.

The CPU allocation usage column 503 indicates a usage amount of the clock frequency in the CPU 202 allocated to the resource pool 130, that is, indicates a total amount of the clock frequencies to be allocated to the virtual servers 120 associated with the resource pool 130.

The CPU allocation free column 504 indicates non-usage amounts (free resource amount of resource pool) of the clock frequencies in the CPU 202 allocated to the resource pool 130, that is, indicates a total amount of the clock frequencies which are not allocated to any virtual servers 120 associated to the resource pools 130 by the clock frequency in the CPU 202 allocated to the resource pool 130. The CPU allocation free column 504 also records a value subtracted the value of CPU usage column 503 from the value of CPU allocation total column 502.

The CPU allocation upper limit column 505 indicates an upper limit value of the clock frequencies in the CPU 202 to be allocated to resource pool 130, that is, indicates that the clock frequencies greater than the value of the CPU allocation upper limit column 505 are not allocated to the resource pool 130, when the total amount of the clock frequencies to be allocated to the resource pool 130 varies.

The CPU allocation reservation column 506 indicates an assurance value of the clock frequency in the CPU 202 to be allocated to the resource pool 130, that is, gives assurance indicating that the value of CPU allocation reservation column 506 is allocated at least to the resource pool 130, when the total amount of the clock frequencies to be allocated to the resource pool 130 varies.

The CPU allocation weight column 507 indicates allocation weights of the clock frequencies used in the CPU 202 to be allocated to the resource pool 130. When varying the total amount of the clock frequencies to be allocated to resource pool 130, the clock frequency to be allocated is adjusted by prioritizing with the values stored in the CPU allocation weight column 507 to allocate the clock frequency to the resource pool 130, in the case of competing with the other resource pool 130 with respect to a physical server group 104.

In this embodiment, the information regarding the clock frequencies in the CPU 202 has been indicated as the performance information of the resource pool 130 to be stored in the pool performance table 500, however, the information contents and its representation form are not limited to the above-mentioned case. Any information may be acceptable if it is the performance information indicating the usage condition of the resources in the resource pool 130, for example, the percentage information indicating the usage amount calculated from the clock frequency and the operating clock frequency in the CPU 202, the capacity of main storage device 203, the access band of the network 207, the disk capacity of external storage device 206, the input and output band of the disk access, etc. Either one or all of the above may be acceptable.

The virtual server/physical server correspondence table 600 is a table for recording a correspondence relation between the virtual server 120 and the physical server 104 on which that virtual server 120 is operated.

FIG. 6 is a configuration diagram of the virtual server/physical server correspondence table 600. Each line indicates a correspondence relation between the virtual server 120 and the physical server 104 on which that virtual server 120 is operated. The virtual server/physical server correspondence table 600 provides a virtual server ID column 601 and a physical server ID column 602.

The virtual server ID column 601 indicates information for uniquely identifying the virtual servers 120.

The physical server ID column 602 indicates information for uniquely identifying the physical servers 104.

The virtual server/pool correspondence table 700 is a table for storing a correspondence relation between the resource pool 130 and virtual server 120.

FIG. 7 is a configuration diagram of the virtual server/pool correspondence table 700. Each line indicates a correspondence relation between the virtual server 120 and resource pool 130. The virtual server/pool correspondence table 700 provides a pool ID column 701 and a virtual server ID column 702.

The pool ID column 701 indicates information for uniquely identifying the resource pools 130.

The virtual server ID column 702 indicates information for uniquely identifying the virtual servers 120.

The pool/physical server correspondence table 800 is a table for storing a correspondence relation between the resource pools 130 and the physical servers 104 which provide the resource for the resource pool 130.

FIG. 8 is a configuration diagram of the pool/physical server correspondence table 800. Each line indicates a correspondence relation between the resource pool 130 and the physical server 104. The pool/physical server correspondence table 800 provides a pool ID column 801, a physical server ID column 802, and a share column 803.

The pool ID column 801 indicates information for uniquely identifying the resource pools 130.

The physical server ID column 802 indicates information for uniquely identifying the physical servers 104.

The share column 803 indicates information indicating whether the resource pool 130 shares the physical server 104. Referring to FIG. 8, the physical server A can use the resource provided by the physical server B as required, and the physical server B can use the resource provided by the physical server A as required (share), when the physical servers A, B provide with the resources to the pools A, B, respectively. However, the physical server C cannot use the resource provided by the physical server D, and the physical server D cannot use the resource provided by the physical server C (occupancy), even though the physical servers C, D provide with the resource to the pool C.

The pool configuration table 900 is a table for storing a correspondence relation between the resource pools 130 and the physical servers 104 which can use the resources in the resource pool 130. The resource pool 130 receives the resources from the physical server 104 having the correspondence relation.

FIG. 9 is a configuration diagram of the pool configuration table 900. Each line indicates a correspondence relation between the resource pools 130 and physical servers 104. The pool configuration table 900 provides a pool ID column 901 and a physical server ID column 902.

The pool ID column 901 indicates information for uniquely identifying the resource pools 130.

The physical server ID column 902 indicates information for uniquely identifying the physical servers 104.

In addition, FIG. 10 will be described later.

Next, the following description will be concerned with a processing to be executed by the information processing system in this embodiment. The CPU 202 in the management server 101 reads out, to a storage area, a program (resource management program) for the resource management stored in the main storage device 203 of the management server 101 to then execute this program on the basis of codes described therein. The processing is executed by coordinating with hardware so that functions in the processing units (110 to 115) provided by the management server 101 are realized. In this regard, a description will be concerned with a case where the following described processing is executed by either one of the processing units (110 to 115), as a matter of convenience.

In addition, the above-mentioned management program may be stored not only in the management server 101, but also in another computer which creates the resource pool 130 so as to execute it.

Figure 11:
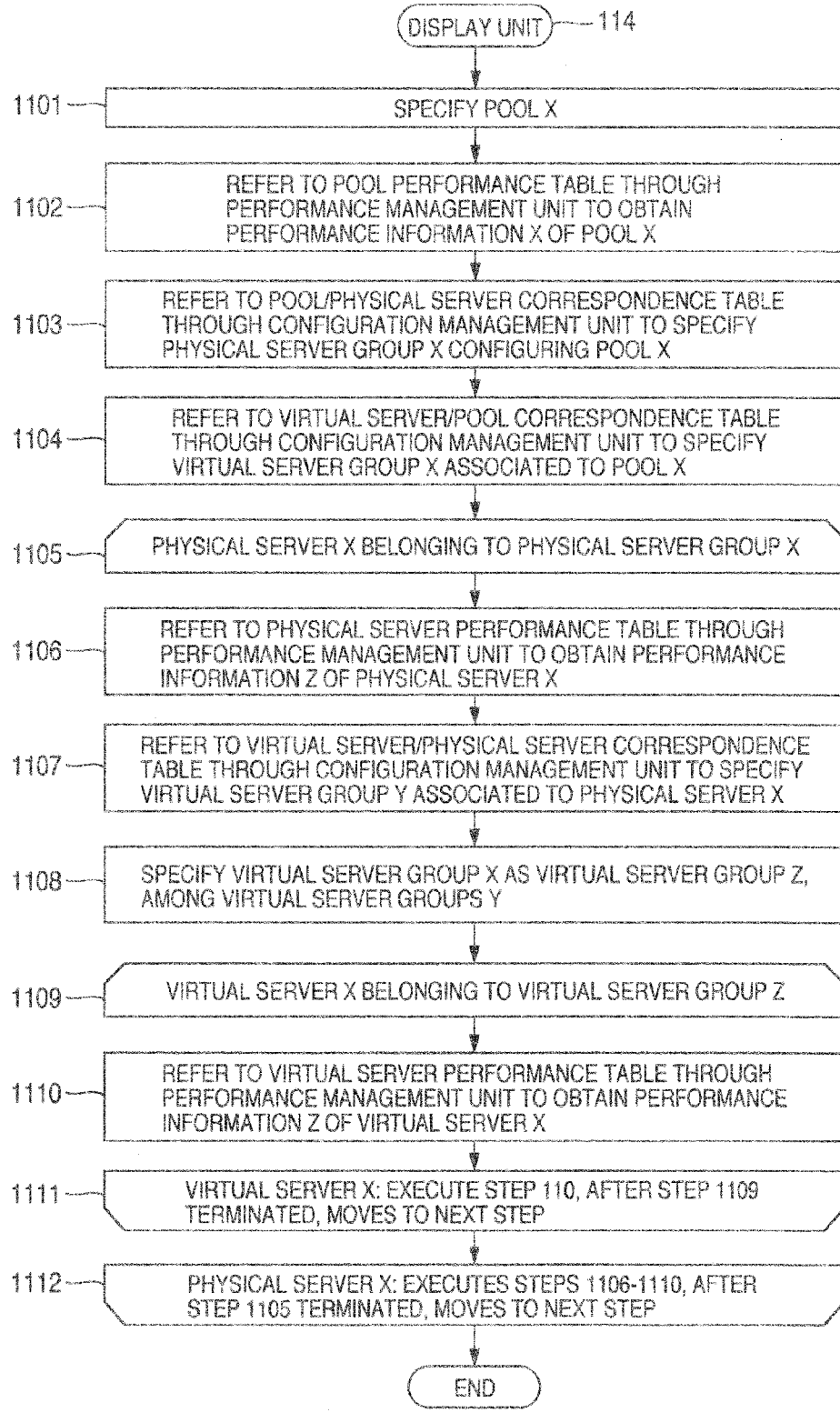
FIG. 11 is a flowchart showing a processing operation of a display unit 114 in the first embodiment.

FIG. 11 is a flowchart showing a processing operation of the display unit 114 in a first embodiment.

(1) The display unit 114 specifies a pool X at step 1101. For example, when receiving a display request specified to a certain resource pool 130, this resource pool 130 is specified as the pool X.

(2) The display unit 114 refers to the pool performance table 500 through the performance management unit 112 to obtain performance information X of the pool X at step 1102. Specifically, the display unit 114 refers to the pool performance table 500 to search the contents of pool ID column 501 with use of the pool X as a key and then store contents, as the performance information, of corresponding line of the CPU allocation total column 502, CPU allocation usage column 503, and CPU allocation free column 504.

(3) The display unit 114 refers to the pool/physical server correspondence table 800 through the configuration management unit 113 to specify a physical server group X which configures the pool X at step 1103. Specifically, the display unit 114 refers to the pool/physical server correspondence table 800 to search the contents of the pool ID column 801 with use of the pool X as a key and store the contents, as the physical server group X, of the physical ID column 802 corresponding to the line. When the contents correspond to a plurality of lines, the contents of all lines corresponding to the physical server column 802 are stored as the physical server group X.

(4) The display unit 114 refers to the virtual server/pool correspondence table 700 through the configuration management unit 113 to specify a virtual server group X associated to the pool X at step 1104. Specifically, the display unit 114 refers to the virtual server/pool correspondence table 700 to search the contents of the pool ID column 701 with use of the pool X as a key and store the contents of virtual server ID column 702, as the virtual server group X, which corresponds to the line. When the contents correspond to the plurality of lines, the contents of all lines of virtual server ID column 702 are stored as the virtual server group X.

(5) The display unit 114 repeats the processing at steps 1106 to 1110 as the physical server X belonging to the physical server group X at step 1105. Here, if a plurality of physical servers 104 are contained in the physical server group X, each of the physical servers 104 is specified to individually determine a target (here, physical server 104) by a loop processing. The target can be determined by other loop processing other than the above description. The processing of the steps 1106 to 1110 are executed for the specified physical server 104.

After processing at steps 1106 to 1110 are executed for all the physical server X belonging to physical server group X, then the processing at step 1105 is terminated to move onto the next step.

(6) The display unit 114 refers to the physical server performance table 400 through the performance management unit 112 to obtain performance information Z of the physical server X at step 1106. Specifically, the display unit 114 refers to the physical server performance table 400 to search the physical server ID column 401 with use of identification information as a key, of the physical server specified at the step 1105 and then store the CPU total column 402, CPU usage column 403 and CPU free column 404, which correspond to the lines as the performance information Z.

(7) The display unit 114 refers to the virtual server/physical server correspondence table 600 through the configuration management unit 113 to specify a virtual server group Y associated to the physical server X at step 1107. Specifically, the virtual server 114 refers to the virtual server/physical server correspondence table 600 to search the contents of physical server ID column 602 with use of the identification information as a key, of the physical server specified at the step 1105 and store the contents of the virtual server ID column 601, as the virtual server group Y, which corresponds to the line. When the contents correspond to the plurality of lines, the contents of all lines of virtual server ID column 601 are stored as the virtual server group Y.

(8) The display unit 114 specifies one belonging to the virtual server group X among the virtual server group Y at step 1108. Among the virtual server group 120 (virtual server group Y) on the specified physical server 104, the virtual server group 120 (virtual server group X) belonging to the specified resource pool 130 is specified, which is set as the virtual server group Z.

(9) The display unit 114 repeats the step 1110 for the virtual server X belonging to the virtual server group Z at step 1109. If the identification information for the plurality of virtual servers 120 is contained in the virtual server group Z, the processing at the step 1110 is executed for the identification information of the respective virtual servers 120 as the virtual server X. After all the step at 1110 is executed for virtual server X belonging to the virtual server group Z, then repetitive processing at step 1109 is terminated to move onto the next step.

(10) The display unit 114 refers to the virtual server performance table 300 through the performance management unit 112 to obtain the performance information Z of the virtual server X at step 1110. Specifically, the display unit 114 refers to the virtual server performance table 300 to search the virtual server ID column 301 with use of the virtual server X as a key and obtain information of the CPU allocation amount column 302 etc., which corresponds to the line.

The display unit 114 associates each other with the pool X, the physical server group X configuring the pool X and the virtual server group Z operating on the physical server group X belonging to the pool X, and then displays those described the above. Further, the display unit 114 also associates each other with the performance information X of the pool X, the performance information Z of the physical server group X, in addition to the performance information Z of the virtual server group Z, and then displays those described the above.

Figure 12:
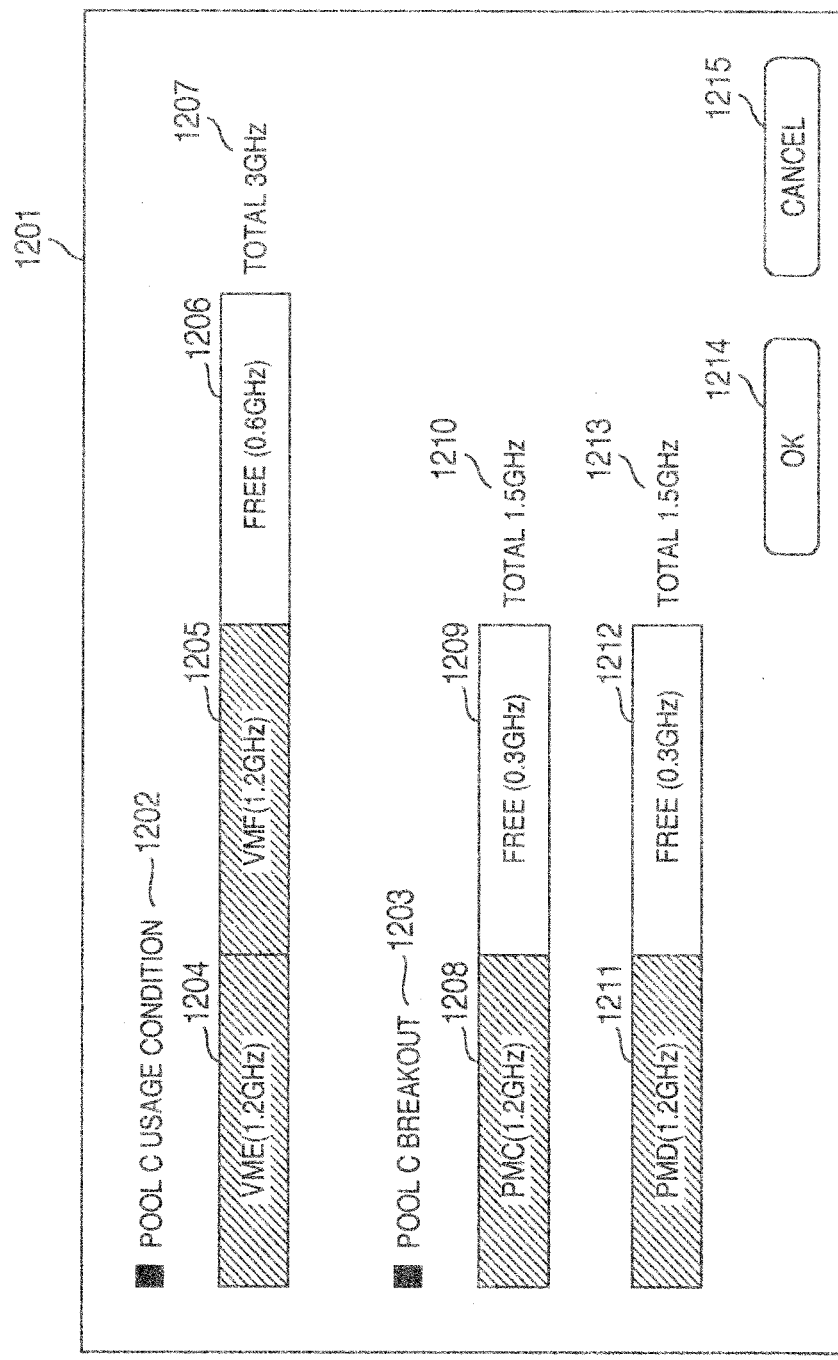
FIG. 12 is a diagram showing a display screen for displaying performance information of a resource pool 130 in the first embodiment.

FIG. 12 is a diagram showing a display screen for displaying the performance information of the resource pool 130 in the first embodiment. The user of resource pool 130 operates the input device 208 in the management server 101 to specify the resource pool 130 and request a display of the performance information to the display unit 114. The display unit 114 then specifies the physical server 104 configuring the specified resource pool 130 via the configuration management unit 113 to specify the virtual server 120 associated to the resource pool 130 and associate with the virtual server 120 and physical server 104. Further, the display unit 114 obtains the performance information of the specified resource pool 130 via the performance management unit 112 to then obtain the performance information of the physical server 104 and the performance information of the virtual server 120 to be operated on the physical server 104 and display the obtained information on a display screen 1201. The user of the resource pool can associate to the usage condition of the resource pool 130, the usage condition of the physical server 104 configuring the resource pool 130, and the usage condition of the virtual server 120 to then refer to them.

The display screen 1201 displays the usage condition regarding the resource pool so as to be a pool C. A usage condition 1202 of the pool C indicates a CPU allocation amount 1204 of a virtual server E (VME) which is a part of the CPU allocation usage amount in the pool C, a CPU allocation amount 1205 of a virtual server F (VMF) which is a part of the CPU allocation usage amount in the pool C, a CPU allocation free amount 1206 in the pool C, and a CPU allocation total amount 1207 in the pool C.

Further, in a breakout 1203 of the pool C indicating the usage condition of resource regarding the physical server (in this case, corresponding to a physical server C (PMC) and a physical server D (PMD)) which provides the resources to the pool C, the breakout 1203 indicates a CPU usage amount 1208 in the physical server C, a CPU free amount 1209 in the physical server C, a CPU total amount 1210 in the physical server C, a CPU usage amount 1211 in the physical server D, a CPU free amount 1212 in the physical server D, and a CPU total amount 1213 in the physical server D.

Furthermore, the display screen 1201 also displays an OK button 1214 to be depressed for executing operations of moving the resources etc. and a cancel button 1215 to be depressed for interrupting the above-mentioned operations, in relation to the usage condition of the displayed resource pool.

In this way, the user of the resource pool 130 can predict the resource amount to be able to use by the virtual server 120 when newly adding the virtual server 120 to resource pool 130. The user can also predict the resource amount to be able to use (or extend) by the virtual server 120 belonging to the resource in the resource pool 130, so that a load amount to be allocated to the virtual server 120 can be adjusted so as to set in the usable resource amount.

Further, the physical server 104 for operating the virtual server 120 is changed as required to collect free resources dispersed to the plurality of physical servers and allocate to the virtual servers 120, so that the resources allocated to the resource pools 130 can be used effectively.

In addition, the display screen 1201 shown in FIG. 12 may be used not only by the users of the resource pool, but also by provider of the resource pool and the administrator of the information processing system. When occurring a performance deterioration of the virtual server 120, the administrator can specify causes of whether the performance deterioration occurs at the resource pool 130, physical server 104, or virtual server 120. The provider of the resource pool 130 can confirm of whether services are given to users of the resource pool 130 along an SLA (Service Level Agreement) etc.

FIG. 13 is also a diagram showing a display screen for displaying the performance information of the resource pool 130 in the first embodiment.

The user of the resource pool 130 specifies a single or plurality of resource pools 130 of a management target to request a display of the usage condition. The display unit 114 then specifies the physical server 104 configuring the resource pool 130 to specify the virtual server 120 associated with the resource pool 130 and thereby display the performance information of the resource pool 130, the specified physical server 104 and the virtual server 120, as to pool information 1301, a virtual server list 1302 and a configuration physical server 1303 on a display screen 1300.

The pool information 1301 is configured by a pool ID 1311, an entirety 1312, an usage 1313, a free 1314, an upper limit 1315, a reservation 1316, and an addable virtual server maximum size 1317 indicating the maximum amount of the additive virtual server to be added if residing, which correspond respectively to the reference numerals 501 to 506 in the pool performance table shown in FIG. 5.

The virtual server list 1302 is configured by a virtual server ID 1321 corresponding respectively to the reference numerals 301 to 305 in the virtual server performance table shown in FIG. 3, an allocation 1323, an upper limit 1324, a lower limit 1325, a physical server ID 1322 indicating the physical server for operating the virtual server, and an extendable amount 1326 of the virtual server if residing.

The configuration physical server 1303 is configured by a physical server 1331 corresponding respectively to the reference numerals 401 to 404 in the physical server performance table shown in FIG. 4, an entirety 1332, a usage 1333, and a free 1334.

Besides, the display screen 1300 indicates an OK button 1340 to be depressed for executing operations of moving the resource and a cancel button 1341 to be depressed for interrupting the above-mentioned operations, in relation to the usage condition of the displayed resource pool.

When adding the virtual server 120 to the resource pool 130, the simulation unit 115 calculates the maximum size of resource amount allocable to the virtual server 120, and the display unit 114 then displays its calculated value (maximum resource amount allocable to a virtual device to be added) on the addable virtual server maximum size 1317. Further, when extending the clock frequency allocated to the virtual server 120 belonging to the resource pool 130, the simulation unit 115 calculates the maximum size of an extendable clock frequency, the display unit 114 displays its calculated value (maximum extended amount) on the extendable amount column 1326.

In this way, the user of the resource pool 130 can predict the resource amount usable by the virtual server 120 when newly adding the virtual server 120 to the resource pool 130. The user can also predict the resource amount further usable by the virtual server 120 belonging to the resource in the resource pool 130, so that the load amount to be allocated to the virtual servers 120 can be adjusted so as to set in the usable resource amount.

Further, the physical server 104 for operating the virtual server 120 is varied as required to collect free resources dispersed to the plurality of physical servers and allocate to the virtual servers 120, so that the resource allocated to the resource pool 130 can be used effectively.

In addition, the display screen shown in FIG. 13 may be used not only by the user of the resource pool, but also by the administrator and the provider who provides the resource pool.

When occurring the performance deterioration of the virtual server 120, the administrator can specify cause of whether the performance deterioration occurs at the resource pool 130, physical server 104 or virtual server 120.

FIG. 14 is also a diagram showing a display screen displaying the performance information of the resource pool 130 in the first embodiment.

The provider of the resource pool 130 specifies a single or plurality of resource pools 130 of a management target to request a display of the usage condition. The display unit 114 then specifies the physical server 104 configuring the resource pool 130 to specify the virtual server 120 associated with the resource pool 130 and thereby display respectively the performance information of the resource pool 130, the specified physical server 104 and virtual server 120, as to pool information 1401, a virtual serve list 1402 and a configuration physical server 1403 on a display screen 1400. In FIG. 14, the display screen 1400 displays a case where one physical server (in this case, physical server A or B) provides the resources to the plurality of resource pools (pool A and pool B in this case), in comparison to FIG. 13.

The pool information 1401, virtual server list 1402 and configuration physical server 1403 are similar to the pool information 1301, virtual server list 1302 and configuration physical server 103, respectively.

A pool ID 1411, an entirety 1412, a usage 1413, a free 1414, an upper limit 1415, a reservation 1416, and an addable virtual server maximum size 1417 are similar to the pool ID 1311, entirety 1312, usage 1313, free 1314, upper limit 1315, reservation 1316, and addable virtual server maximum size 1317, respectively.

A virtual server ID 1421, a physical server ID 1423, an allocation 1424, an upper limit 1425, a lower limit 1426, an extendable amount 1427, are similar to the virtual server ID 1321, physical server ID 1322, allocation 1323, upper limit 1324, lower limit 1325, and extendable amount 1326, respectively.

An OK button 1440 and a cancel button 1441 are similar to the OK button 1340 and cancel button 1341, respectively.

When adding the virtual server 120 to the resource pool 130, the simulation unit 115 calculates the maximum size of resource amount allocable to that virtual server 120, and the display unit 114 then displays its calculated value in the addable virtual server maximum size 1417. Further, when extending the clock frequency allocated to the virtual server 120 belonging to the resource pool 130, the simulation unit 115 calculates the maximum size of an extendable clock frequency, and the display unit 114 displays its calculated value in the extendable amount column 1427.

In this way, the provider of the resource pool 130 can predict the resource amount usable by the virtual server 120 when newly adding the virtual server 120 to the resource pool 130. The provider can also predict the resource amount further usable by the virtual server 120 belonging to the resource in the resource pool 130, so that the load amount to be allocated to the virtual servers 120 can be adjusted so as to set in the usable resource amount.

Further, the physical server 104 for operating the virtual server 120 is varied, as required, to collect free resources dispersed to the plurality of physical servers and allocate to the virtual servers 120, so that the resources allocated to the resource pool 130 can be used effectively.

In addition, the display screen shown in FIG. 14 may be used not only by the provider of the resource pool, but also by the administrator and the provider who uses the plurality of resource pools.

When occurring the performance deterioration of the virtual server 120, the administrator can specify the cause of whether the performance deterioration occurs at the resource pool 130, physical server 104 or virtual server 120.

The user of the resource pool 130 can confirm whether the resource pool is provided along the SLA etc. The resource amount usable by the virtual server 120 can also be predicted when newly adding the virtual server 120 to the resource pool 130. The number of virtual servers 120 addable to and operable the resource pool 130 can further be predicted. The number of virtual servers 120 to be operated in the resource pool 130 can furthermore be limited in consideration of the configuration and performance of the physical server 104 configuring the resource pool 130.

Further, the resource amount usable by the virtual server 120 belonging to the resources in the resource pool 130 can also be predicted, so that the load amount to be allocated to the virtual servers 120 can be adjusted so as to set in the usable resource amount.

Further, the user of resource pool 130 varies the physical server 104 for operating the virtual server 120 to collect the free resources dispersed to the plurality of physical servers and allocate it to the virtual server 130, so that the resource allocated to the resource pool 130 can be used effectively. The setting of resource allocation can also be reviewed for the virtual server 120 to be applied in the resource pool 130. When managing the plurality of resource pools 130, the performance and configuration displayed on the display screen 1400 in FIG. 14 are referred to be able to adjust a setting of handling resource appropriately between the resource pools 130.

Figure 15:
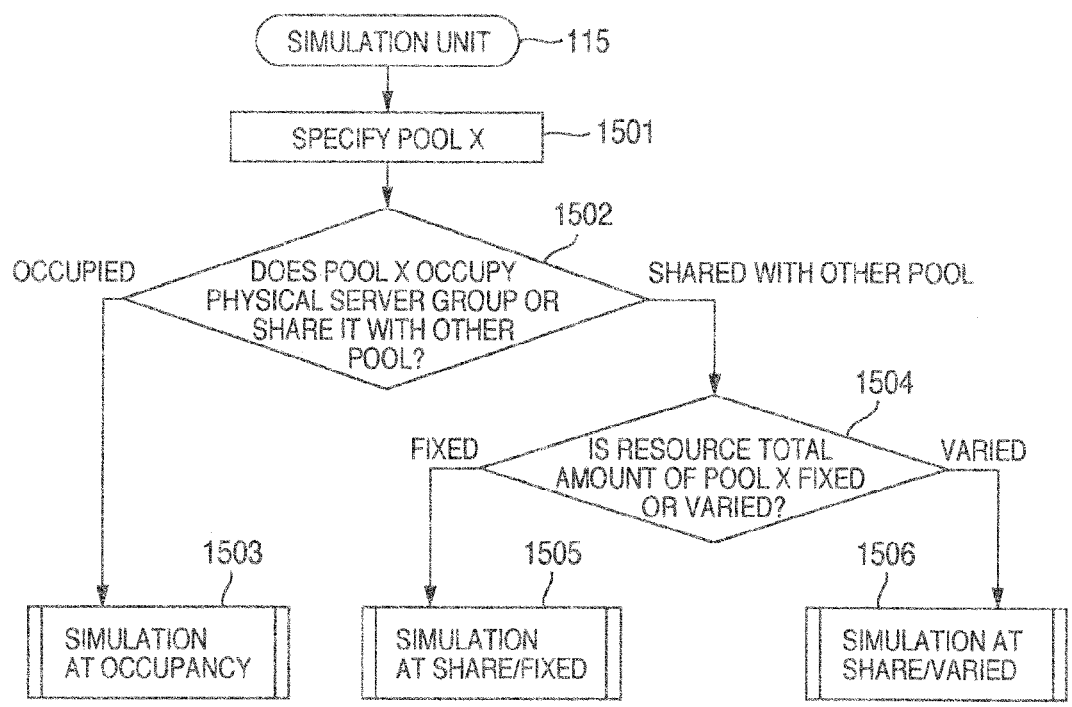
FIG. 15 is a flowchart of a processing executed by simulation unit 115.

FIG. 15 is a flowchart showing a processing of the simulation unit 115.

(1) The simulation unit 115 specifies the pool X at step 1501. For example, a display request of the performance information in the resource pool 130 is received from the user of resource pool 130. The display unit 114 then designates the resource pool 130, received the display request, to the simulation unit 115 to request a simulation. The designated resource pool 130 is specified as the pool X.

(2) The simulation unit 115 determines whether the pool X occupies the physical server group or shares it with the other pool at step 1502. Specifically, the simulation unit 115 refers to the pool/physical server correspondence table 800 through the configuration management unit 113 to search the contents of the pool ID column 801 with use of the pool X as a key. If the contents of the share column 803 corresponding to the line are occupied, it is determined that the pool X occupies without sharing with the other pool. If the contents are shared, it is determined that the pool X is shared with the other pool. When there is plural number of lines as the corresponding lines, it is determined that the pool is occupied if all of the lines in the column are occupied, otherwise, it is determined that the pool is shared.

(3) If the determination is as "occupancy" at the step 1502, the simulation unit 115 executes a simulation on the occupancy at step 1503. This processing will be described with reference to FIGS. 16A, 16B and 16C in detail.

(4) If it is determined that the pool X shares the physical server group with the other pool as "shared with the other pool" at the step 1502, the simulation unit 115 determines whether a resource total amount of the pool X is fixed or varied at step 1504. For example, the simulation unit 115 refers to the pool performance table 500 through the performance management unit 112, and determines that the resource total amount is fixed if the contents of the CPU allocation total column 502, CPU upper limit column 505, and CPU allocation reservation column 506, are coincident with each other, otherwise the resource total amount is varied.

(5) If it is determined that the resource total amount is fixed as "fixed" at the step 1504, the simulation unit 115 executes the simulation on a share/fixed at step 1505. This processing will be described with reference to FIGS. 17A, 17B and 17C in detail.

(6) If it is determined that the resource total amount is varied as "varied" at the step 1504, the simulation unit 115 executes the simulation on a share/varied at step 1506. This processing will be described with reference to FIGS. 18A, 18B and 18C in detail.

Figure 16B:
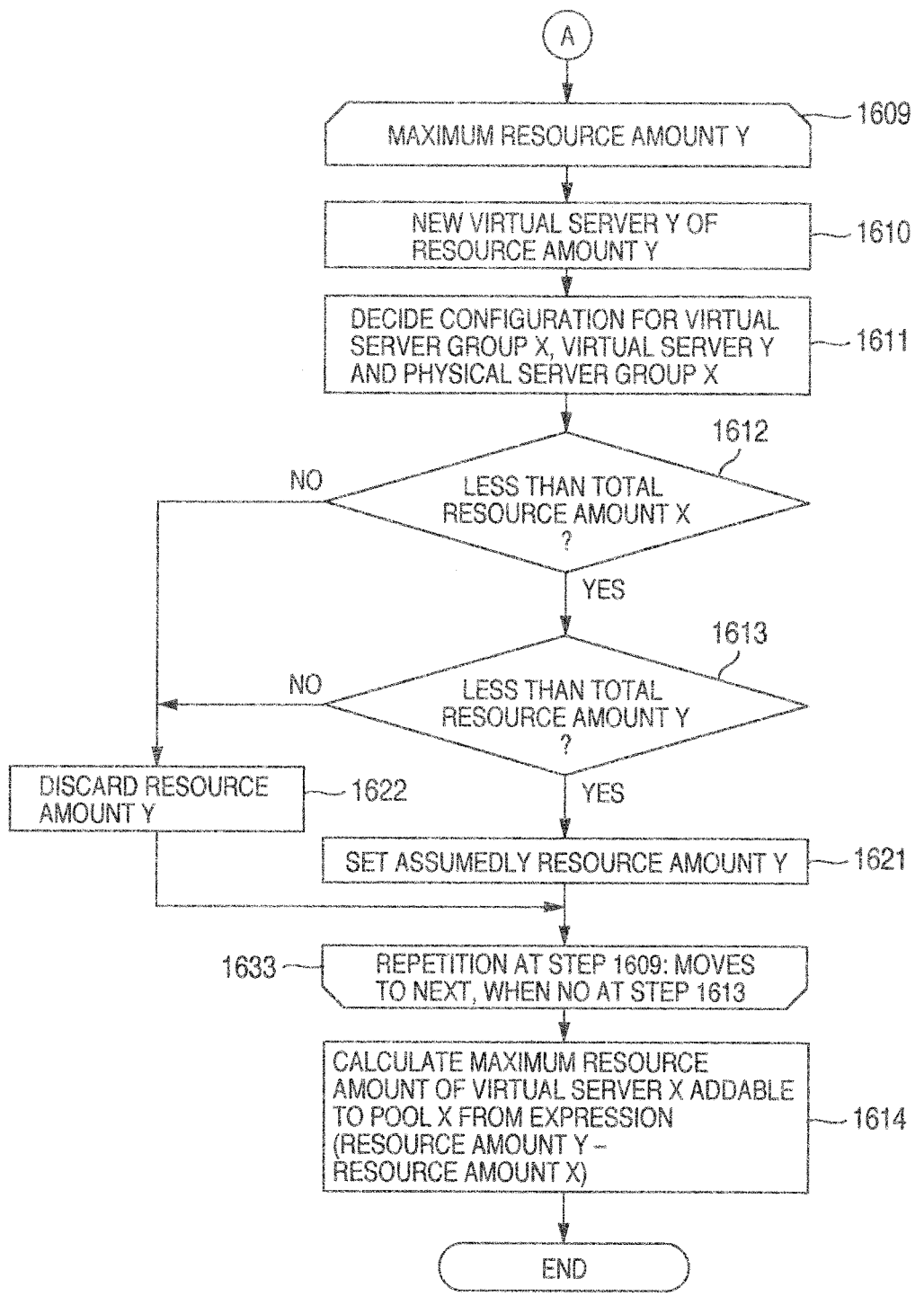
FIG. 16B is a flowchart of a processing operation when the resource pool 130 occupies a physical server group.

FIGS. 16A, 16B and 16C are flowcharts showing a processing operation when the resource pool 130 occupies the physical server group in the processing executed by the simulation unit 115.

(1) The simulation unit 115 obtains a total resource amount X of the pool X at step 1601. Specifically, the simulation unit 115 refers to the pool performance table 500 through the performance management unit 112 to search the pool ID column 501 with use of the pool X as a key, obtain the contents of the CPU allocation total column 502 corresponding to the line, and set as the total resource amount X.

(2) The simulation unit 115 obtains the physical server group X configuring the pool X at step 1602. Specifically, the simulation unit 115 refers to the pool configuration table 900 through the configuration management unit 113 to search the pool ID column 901 with use of the pool X as a key and store the contents, as the physical server group X, of the physical server ID column 902 corresponding to the line. When the contents correspond to plural lines, the contents of all lines of physical server ID column are stored as the physical server group X.

(3) The simulation unit 115 repeats the processing at a step 1604 executed in the physical server X belonging to the physical server group X at step 1603. If the identification information for the plurality of physical servers 104 belongs to the physical server group X, the processing at the step 1604 is repeated for the identification information of the respective physical servers 104.

After processing at step 1604 is executed for all the physical server X belonging to physical server group X, then repetitive processing at step 1603 is terminated to move onto the next step.

(4) The simulation unit 115 obtains a total resource amount of the physical server X at step 1604. Specifically, the simulation unit 115 refers to the physical server performance table 400 through the performance management unit 112 to search the contents of the physical server ID column 401 with use of the physical server X as a key and store the contents, as the total resource amount Y, of the CPU total column 402 corresponding to the line.

(5) The simulation unit 115 obtains the virtual server group X belonging to the pool X at step 1605. Specifically, the simulation unit 115 refers to the virtual server/pool correspondence table 700 through the configuration management unit 113 to search the pool ID column 701 with use of the pool X as a key and store the contents, as the virtual server group X, of the virtual server ID column 702 corresponding to the line. When the contents correspond to plural lines, the contents of all lines of virtual server ID column 702 are stored as the virtual server group X.

(6) The simulation unit 115 repeats respectively the processing at a step 1607 for the virtual servers X belonging to the virtual server group X at step 1606.

After executing step 1607 for all the virtual server X belonging to the virtual server group X, then repetitive processing at step 1606 is terminated to move onto the next step.

(7) The simulation unit 115 calculates a resource amount X required for processing a load on the virtual server X at step 1607. Specifically, the simulation unit 115 refers to the virtual server performance table 300 through the performance management unit 112 to search the virtual server ID column 301 with use of the virtual server X as a key and store a value, as the necessary resource amount X, combined with the contents of CPU allocation amount column 302 corresponding to the line and the contents of CPU allocation shortage amount column 303.

(8) The simulation unit 115 determines a simulation target at step 1608. For example, the simulation unit 115, sets the pool X in as the simulation target when a request arose so as to simulate the maximum resource amount of a virtual server size addable to the pool X from the display unit 114. In contrast, the simulation unit 115 sets the virtual server 120 in as the simulation target when a request arose so as to simulate the resource amount to which the virtual server 120 belonging to the resource pool 130 is extendable.

In addition, the above-mentioned request is executed by the operation from the input device 208 of the user in the management server 101.

(9) If the pool X is a simulation target determined as "pool X" at the step 1608, the simulation unit 115 repeatedly executes the processing from steps 1610 to 1613 in FIG. 16B until the maximum resource amount Y is found at step 1609. The maximum value of resource amount is calculated so that it is addable to the resource pool 130 of the specified simulation target.

In the repetitive processing at step 1609, gradually increasing resource amount Y, and when judgment processing at steps 1612 and 1613 turned out to be NO for all the structure at step 1611, then repetitive processing at step 1609 is terminated to move onto the next step.

(10) The simulation unit 115 assumes that a new virtual server Y of the resource amount Y is present at step 1610. Specifically, the simulation unit 115 assumes that the virtual server Y designated to a certain CPU clock frequency is present in the pool X.

(11) The simulation unit 115 decides the configuration of the virtual server group X, virtual server Y and physical server group X at step 1611. That is, the simulation unit 115 decides the virtual server 120 contained in the virtual server group X and the physical server 104 for operating the virtual server Y if the virtual server Y is present in the pool X.

(12) The simulation unit 115 determines whether the total of the resource amount of the virtual server group X and the virtual server Y is less than the total resource amount X (refer to the step 1601) at step 1612. This is because the resources equal to or greater than the total size of resource pool 130 cannot be provided to the virtual server 120 belonging to the resource pool 130. If the total of resource amount is less than the total resource amount X as "Yes" at the step 1612, the processing proceeds to a step 1613. If this is not the case as "No" at the step 1612, the maximum resource amount Y (refer to the step 1609) is not found by the configuration determined at the step 1611. Therefore, the assumed resource amount Y is discarded at step 1622, and the processing then proceeds to the next step.

(13) In the configuration determined at the step 1611, the simulation unit 115 determines whether the total of the resource amount of the virtual servers 120 on the respective physical servers X is less than the total resource amount Y (refer to the step 1604) of the physical servers X at step 1613. This is because the virtual server 120 cannot be operated on the physical server 104 with the resource amount greater than that of the physical server 104. If the resource amount is less than the total resource amount Y as "Yes" at the step 1613, the resource amount Y is set assumedly at this time at step 1621, and the processing then proceeds to the next step. If this is not the case as "No" at the step 1613, the maximum resource amount Y (refer to the step 1609) is not found in the configuration determined at the step 1611. Therefore, the assumed resource amount Y is discarded at the step 1622, and the processing proceeds to the next step.

As a result, the resource amount, which becomes maximum, is determined as a resource amount, among the assumedly set resource amounts Y.

(14) The simulation unit 115 calculates the maximum resource amount of the virtual server X addable to the pool X from an expression (resource amount Y (refer to the step 1610)–resource amount X (refer to the step 1607)) to then output a calculated value, and terminates the processing at step 1614. Here, the output value is the maximum securable resource amount when the virtual server 120 is newly added to the resource pool 130.

(15) If the simulation target is the virtual server 120 in the virtual server group X at the determination as "virtual server Y in virtual server group X" at the step 1608, the simulation unit 115 repeats the processing from steps 1616 to 1619 in FIG. 16C until the maximum resource amount Y is found at step 1615 in FIG. 16C.

In the repetitive processing at step 1615, gradually increasing resource amount Y, and when judgment processing at steps 1618 and 1619 turned out to be NO for all the structure at step 1617, then the repetitive processing at step 1615 is terminated to move onto the next step.

(16) The simulation unit 115 assumes that the resource amount X required for the virtual server X is the resource amount Y at the step 1616. That is, the simulation unit 115 simulates whether the resource amount of the virtual server X can be extended up to the resource amount Y.

(17) The simulation unit 115 decides configuration of the virtual server group X and physical server group X at step 1617.

(18) The simulation unit 115 determines whether the total of resource amount of the virtual server group X is less than the total resource amount X (refer to the step 1601) when the configuration is determined at the step 1617, at step 1618. This is because the resources equal to or greater than the total size of the resource pool 130 cannot be provided to the virtual server 120 belonging to the resource pool 130. If the total of resource amount is less than the total resource amount X as "Yes" at the step 1618, the processing proceeds to step 1619. If this is not the case as "No" at the step 1618, the maximum resource amount Y is not found by the configuration determined at the step 1617, therefore, the assumed resource amount Y is discarded at step 1624, and the processing proceeds to the next processing.

(19) The simulation unit 115 determines whether the total of resource amount of the virtual servers 120 on the respective physical servers X is less than the total resource amount Y (refer to the step 1604) of the physical server X by the configuration determined at the step 1617 at the step 1619. This is because the virtual server 120 cannot be operated on the physical server 104 with the resource amount equal to or greater than that of the physical server 104. If the total of resource amount is less than the total resource amount Y as "Yes" at the step 1619), the resource amount Y is assumedly set at this time at step 1623, and the processing proceeds to the next step. If this is not the case as "No" at the step 1619, the maximum resource amount Y is not found by the configuration determined at the step 1617, therefore, the assumed resource amount Y is discarded at step 1624, and the processing proceeds to the next step.

As a result, the resource amount, which becomes maximum, is determined as a resource amount, among the assumedly set resource amounts Y.

(20) The simulation unit 115 calculates the resource amount extendable by the virtual server X from an expression (resource amount Y (refer to the step 1616)–resource amount X (refer to the step 1607)) to then output a calculated value, and the processing is terminated at step 1620. Here, the output value is the maximum resource amount extendable by the virtual server X.

Figure 17A:
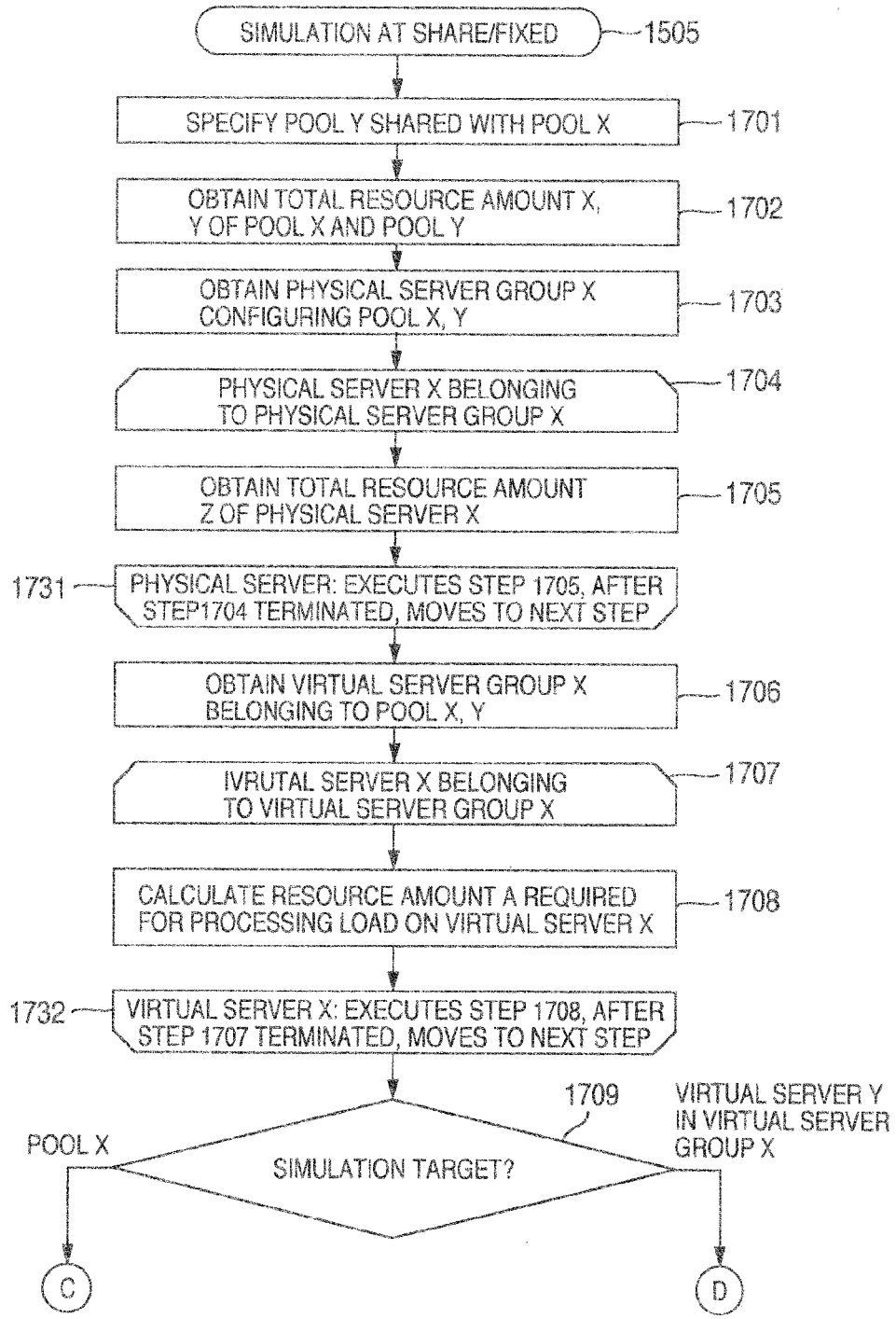
FIG. 17A is a flowchart of a processing operation when the size fixed resource pool 130 shares the physical server group.
Figure 17C:
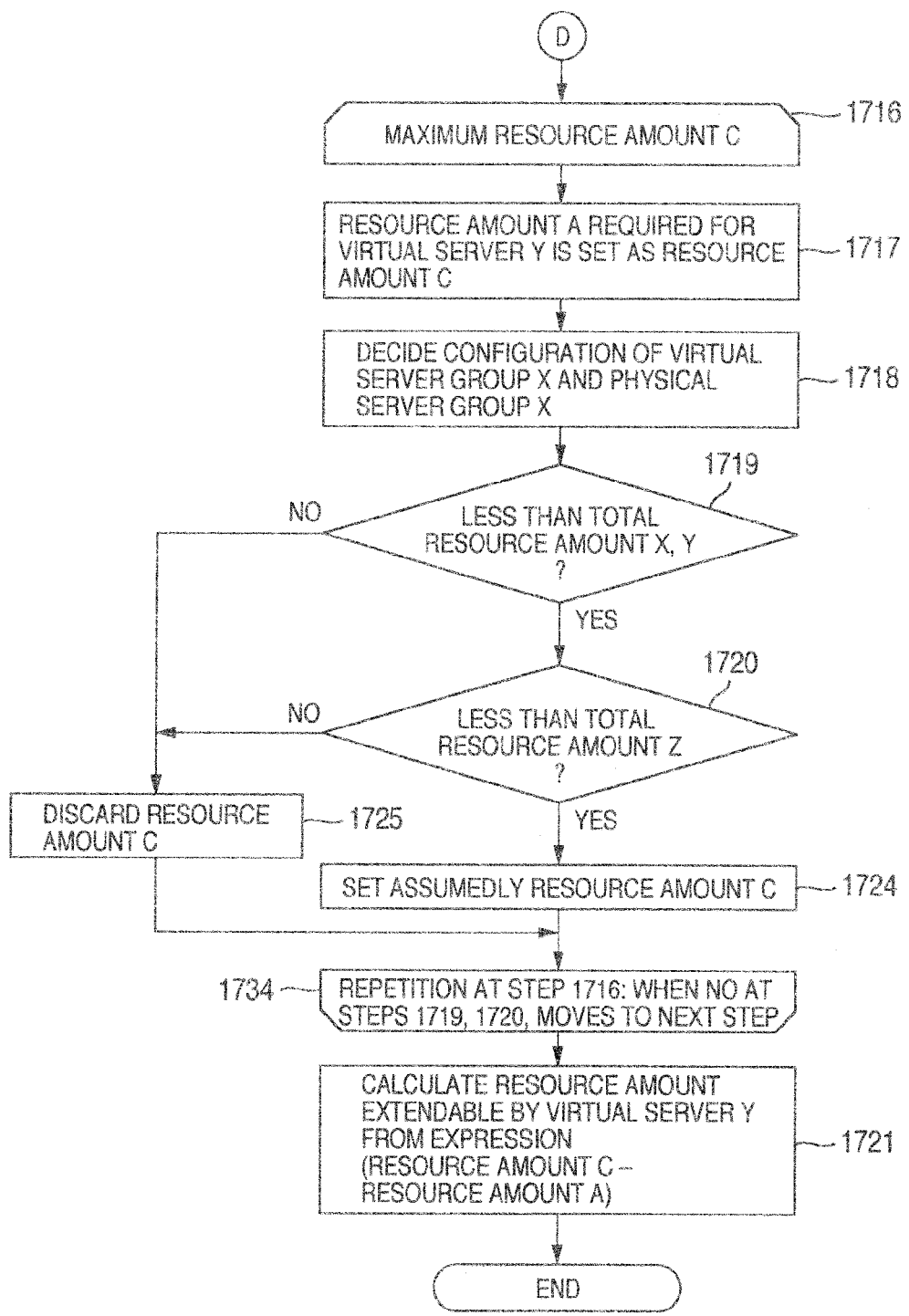
FIG. 17C is a flowchart of a processing operation when the size fixed resource pool 130 shares the physical server group.

FIGS. 17A, 17B and 17C are flowcharts showing processing operations when the resource pool 130, the size of which is fixed, shares the physical server group, among the processing operations executed by the simulation unit 115. The steps commonly described in FIGS. 15 and 16A to 16C are omitted in the following description.

(1) The simulation unit 115 specifies a pool Y shared with the pool X (refer to the step 1501) at step 1701.

(2) The simulation unit 115 obtains a total resource amount X, Y of the pool X and pool Y at step 1702.

(3) The simulation unit 115 obtains the physical server group X configuring the pools X, Y at step 1703.

(4) The simulation unit 115 repeats the processing of step 1705 for the physical server X belonging to the physical server group X at step 1704.

After executing processing at step 1705 for all the physical sever X belonging to physical server group X, then the repetitive processing at step 1704 is terminated to move onto the next step.

(5) The simulation unit 115 obtains a total resource amount Z of the physical server X at the step 1705.

(6) The simulation unit 115 obtains the virtual server group X belonging to the pools X, Y at step 1706.

(7) The simulation unit 115 repeats the processing of step 1708 for the virtual server X belonging to the virtual server group X at step 1707.

After executing processing at step 1708 for all the virtual server X belonging to virtual server group X, then the repetitive processing at step 1707 is terminated to move onto the next step.

(8) The simulation unit 115 calculates a resource amount A required for processing the load on the virtual server X at the step 1708.

(9) The simulation unit 115 determines a simulation target at step 1709.

(10) If the pool X is the simulation target determined as "pool X" at the step 1709, the simulation unit 115 repeatedly executes the processing from steps 1711 to 1714 in FIG. 17B until the maximum resource amount B is found at step 1710 in FIG. 17B.

In the repetitive processing at step 1710, gradually increasing resource amount B, and when judgment at steps 1713 and 1714 turned out to be NO for all the structure at step 1712, then the repetitive processing at step 1710 is terminated to move onto the next step.

(11) The simulation unit 115 assumes that a new virtual server Z of the resource amount B is present at the step 1711. Specifically, the simulation unit 115 assumes that a virtual server Y designated to a certain CPU clock frequency is present in the pool X.

(12) The simulation unit 115 decides configurations of the virtual server group X, virtual server Z and physical server group X at step 1712.

(13) The simulation unit 115 determines whether the total of resource amount of the virtual server group X belonging to the pool X and the virtual server Y is less than the total resource amount X (refer to the step 1702), and the total of resource amount of the virtual server group X belonging to the pool Y is less than the total resource amount Y (refer to the step 1702) in the configuration determined at the step 1712, at step 1713. If the total of resource amount is less than the total resource amount X, Y as "Yes" at the step 1713, the processing proceeds to step 1714. If this is not the case as "No" at the step 1713, the maximum resource amount B is not found by the configuration determined at the step 1712, therefore, the assumedly set resource amount B is discarded at step 1723, and the processing proceeds to the next step.

(14) The simulation unit 115 determines whether the total of resource amount of the virtual server 120 on the respective physical servers X is less than the total resource amount Z (refer to the step 1705) of the physical servers X at step 1714, in the configuration determined at the step 1712. If the total of resource amount is less than the total resource amount Z as "Yes" at the step 1714, the resource amount B is assumedly set at this time at step 1722, and the processing proceeds to the next step. If this is not the case a "No" at the step 1714, the maximum resource amount B is not found by the configuration determined at the step 1712, therefore, the assumedly set resource amount B is discarded at step 1723, and the processing proceeds to the next step.

As a result, the resource amount, which becomes maximum, is determined as a resource amount, among the assumedly set resource amount B.

(15) The simulation unit 115 calculates the maximum resource amount of the virtual server Z addable to the pool X from an expression (resource amount B (refer to the step 1711)–(resource amount A (refer to the step 1708)) to then output a calculated value, and the processing is terminated at step 1715.

(16) If the simulation target is the virtual server 120 in the virtual server group X at determination as "virtual server Y in virtual server group X" at the step 1709, the simulation unit 115 repeats the processing from steps 1717 to 1720 until the maximum resource amount C is found at step 1716.

In the repetitive processing at step 1716, all the structure is determined at step 1718, gradually increasing resource amount C, and when judgment at steps 1719 and 1720 both turned out to be NO, then the repetitive processing at step 1716 is terminated to move onto the next step.

(17) The simulation unit 115 assumes that the resource amount A required for the virtual server X is assumedly set as a resource amount C at step 1717.

(18) The simulation unit 115 decides the configuration of the virtual server group X and physical server group X at step 1718.

(19) The simulation unit 115 determines whether the total of resource amount of the virtual sever group X belonging to the pool X is less than the total resource amount X (refer to the step 1702) and less than the total resource amount Y (refer to the step 1702) of the virtual server group X belonging to the pool Y at step 1719, in the configuration determined at the step 1718. If the total of resource amount is less than the total resource amount X, Y as "Yes" at the step 1719, the processing proceeds to step 1720. If this is not the case as "No" at the step 1719, the maximum resource amount C is not found by the configuration determined at the step 1718, therefore, the assumedly set resource amount C is discarded at step 1725, and the processing proceeds to the next step.

(20) The simulation unit 115 determines whether the total of resource amount of the virtual servers 120 on the respective physical servers X is less than the total resource amount Z (refer to the step 1705) of the physical server X, in the configuration determined at the step 1718, at step 1720. If the total of resource amount is less than the total resource amount Z as "Yes" at the step 1720, the resource amount C is assumedly set at this time at step 1724, and the processing proceeds to the next step. If this is not the case as "No" at the step 1720, the maximum resource amount C is not found by the configuration determined at the step 1718, therefore, the assumedly set resource amount C is discarded at the step 1725, and the processing proceeds to the next step.

As a result, the resource amount, which becomes maximum, is determined as a resource amount, among the assumedly set resource amount C.

(21) The simulation unit 115 calculates the resource amount extendable by the virtual server Y from an expression (resource amount C (refer to the step 1717)–(resource amount A (refer to the step 1708)) to then output a calculated value, and the process is then terminated at step 1721.

Figure 18A:
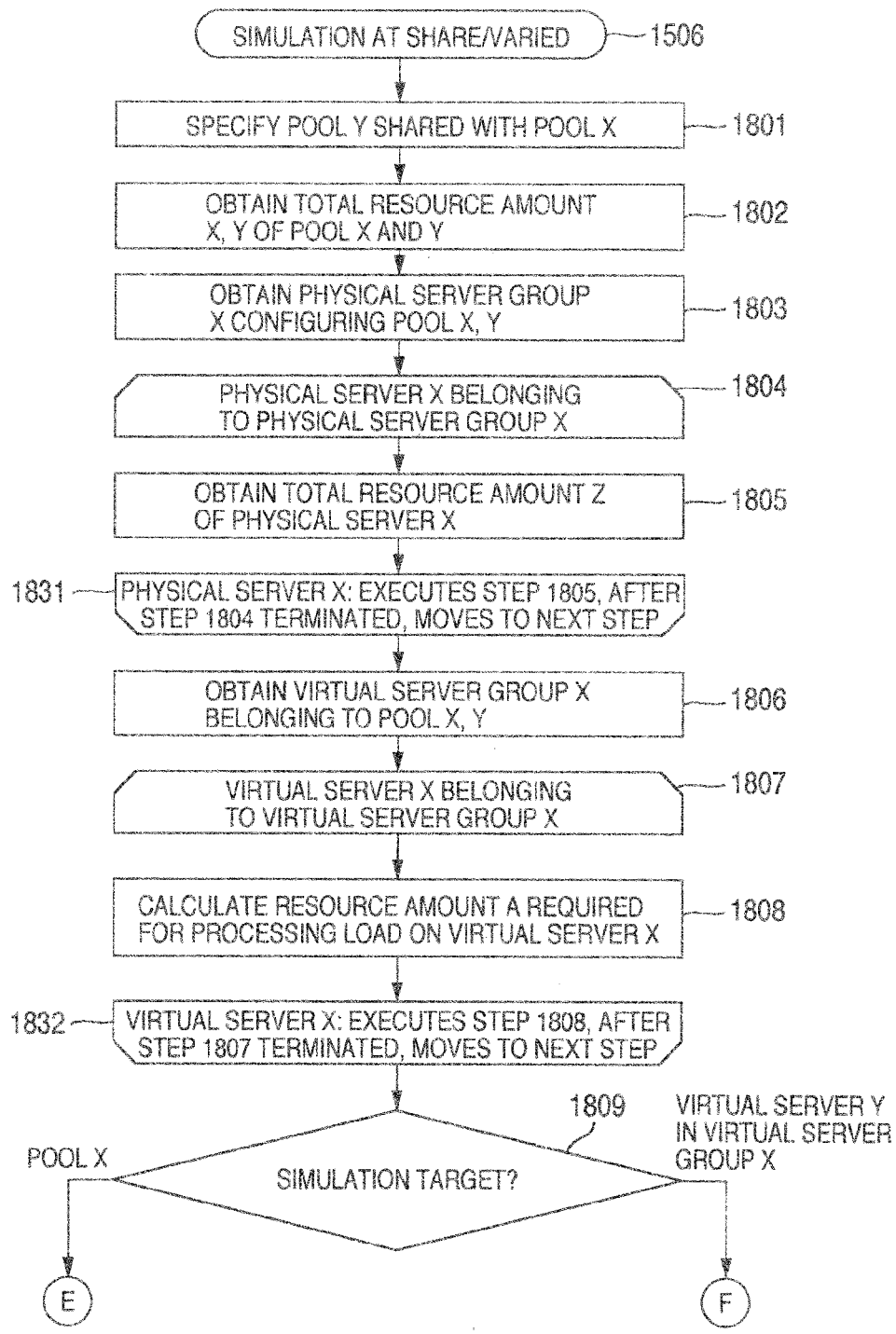
FIG. 18A is a flowchart of a processing operation when the size varied resource pool 130 shares the physical server group.
Figure 18B:
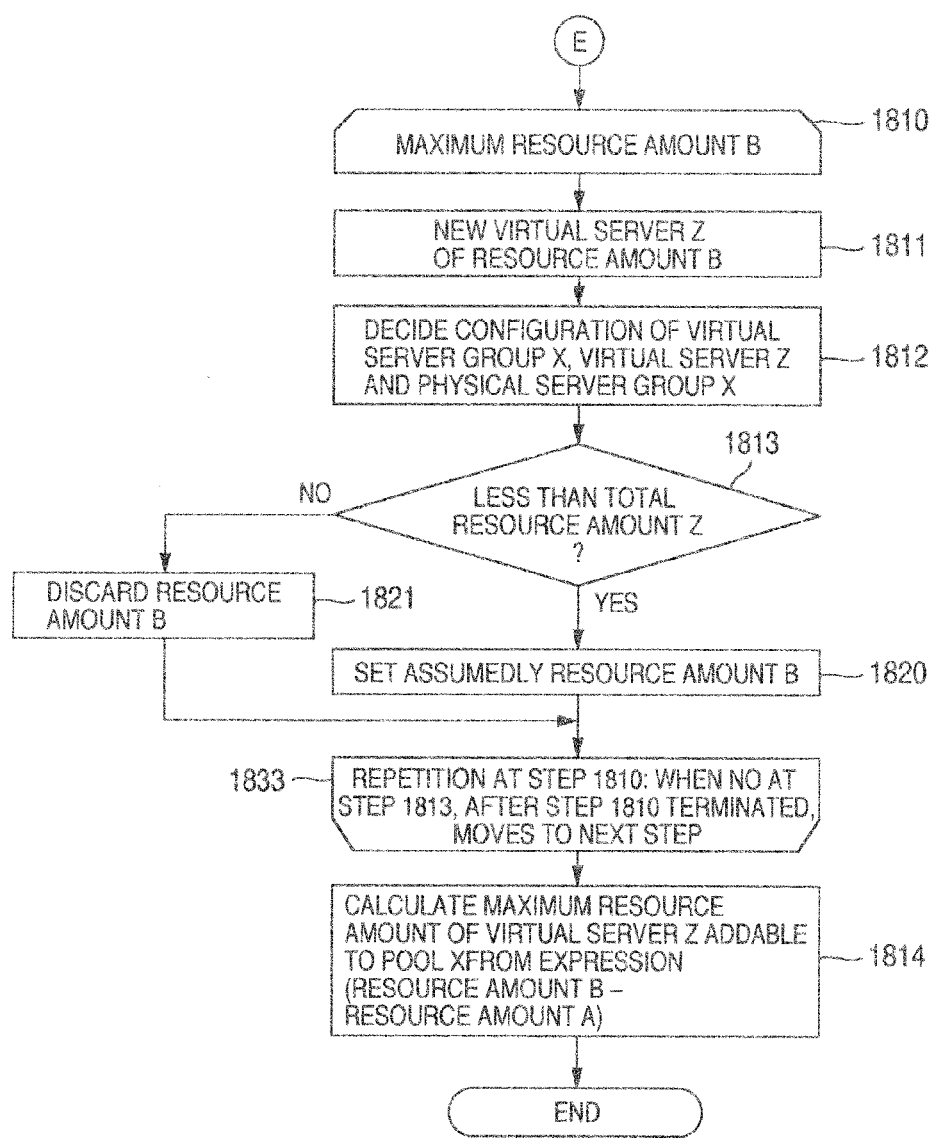
FIG. 18B is a flowchart of a processing operation when the size varied resource pool 130 shares the physical server group.
Figure 18C:
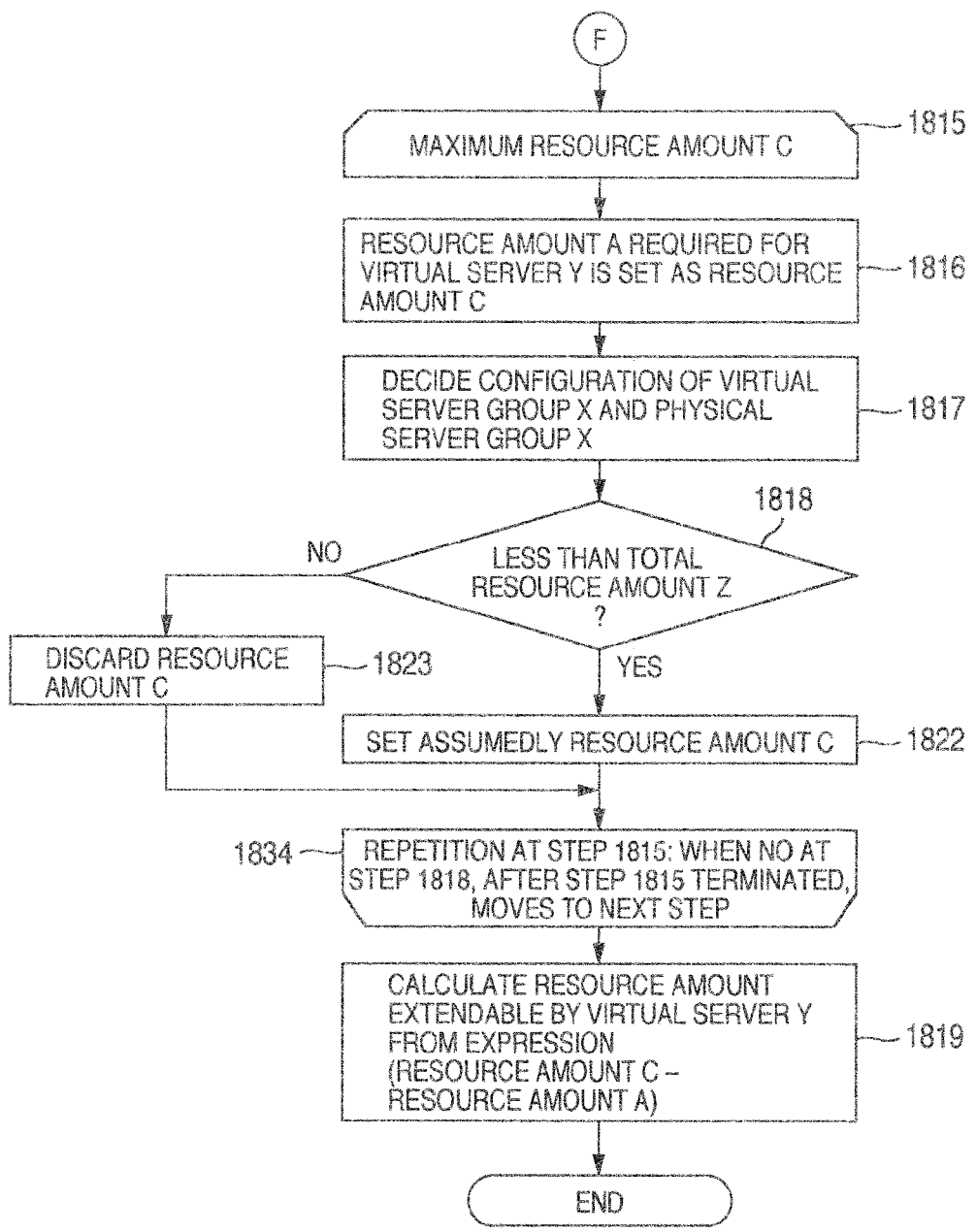
FIG. 18C is a flowchart of a processing operation when the size varied resource pool 130 shares the physical server group.

FIGS. 18A, 18B and 18C are flowcharts showing processing operations when the resource pool 130, the size of which is varied, shares the physical server, among the processing operations executed by the simulation unit 115. The steps commonly described in FIGS. 15 and 17A to 17C are omitted in the following description.

(1) The simulation unit 115 specifies the pool Y shared with the pool X (refer to the step 1501) at step 1801.

(2) The simulation unit 115 obtains the total resource amount X, Y of the pool X and pool Y at step 1802.

(3) The simulation unit 115 obtains the physical server group X configuring the pools X, Y at step 1803.

(4) The simulation unit 115 repeats the processing of the step 1805 for the physical server X belonging to the physical server group X at step 1804.

After the processing at step 1805 is executed for all the physical server X belonging to the physical server group X, then the repetitive processing at step 1804 is terminated to move onto the next step.

(5) The simulation unit 115 obtains the total resource amount Z of the physical server X at step 1805.

(6) The simulation unit 115 obtains the virtual server group X belonging to the pools X, Y at step 1806.

(7) The simulation unit 115 repeats the processing of the step 1808 for the virtual server X belonging to the virtual server group X at step 1807.

After executing processing at step 1808 for all the virtual server X belonging to virtual sever group X, then the repetitive processing at step 1807 is terminated to move onto the next step.

(8) The simulation unit 115 calculates the resource amount A required for processing the load on the virtual server X at step 1808.

(9) The simulation unit 115 determines a simulation target at step 1809.

(10) If the pool X is the simulation target at the determination as "pool X" at the step 1809, the simulation unit 115 repeatedly executes the processing from steps 1811 to 1813 until the maximum resource amount B is found at step 1810.

In the repetitive processing at step 1810, gradually increasing resource amount B, and when judgment processing at step 1813 turned out to be NO, then the repetitive processing at step 1810 is terminated to move onto the next step.

(11) The simulation unit 115 assumes that a new virtual server Z of the resource amount B is present at the step 1811. Specifically, the simulation unit 115 assumes that the virtual server Y designated to a certain CPU clock frequency is present in the pool X.

(12) The simulation unit 115 decides the configuration of the virtual server group X, virtual server Z and physical server group X at a step 1812.

(13) The simulation unit 115 determines whether the total of resource amount of the virtual server 120 on the respective physical servers X is less than the total resource amount Z (refer to the step 1805) in the configuration determined at the step 1812, at a step 1813. If the total of resource is less than the total resource amount Z as "Yes" at the step 1813, the resource amount B is assumedly set at this time, at step 1820, and the processing proceeds to the next step. If this is not the case as "No" at the step 1813, the maximum resource amount B is not found in the configuration determined at the step 1812, therefore, the assumedly set resource amount B is discarded at step 1821, and the processing proceeds to the next step.

As a result, the resource amount, which becomes maximum, is determined as a resource amount, among the assumedly set resource amount B.

(14) The simulation unit 115 calculates the maximum resource amount of the virtual server Z addable to the pool X from an expression (resource amount B (refer to the step 1811)–resource amount A (refer to the step 1808)) to then output a calculated value, and the processing is terminated at step 1814.

(15) If the simulation target is the virtual server in the virtual server group X at the determination as "virtual server Y in virtual server group X" at the step 1809, the simulation unit 115 repeats the processing from steps 1816 to 1818 until the maximum resource amount C is found at step 1815.

In the repetitive processing at step 1815, gradually increasing resource amount C, and when the judgment at step 1818 turned out to be NO, then the repetitive processing at step 1815 is terminated to move onto the next step.

(16) The simulation unit 115 assumes that the resource amount A required for the virtual server X is set as the resource amount C at the step 1816.

(17) The simulation unit 115 decides the configuration of the virtual server group X and physical server group X at step 1817.

(18) The simulation unit 115 determines whether the total of resource amount of the virtual server 120 on the respective physical servers X is less than the total resource amount Z (refer to the step 1805) of the physical server X at step 1818. If the total of resource amount is less than the total resource amount Z as "Yes" at the step 1818, the resource amount C is assumedly set at this time at step 1822, the processing then proceeds to the next step. If this is not the case as "No" at the step 1818, the maximum resource amount C is not found by the configuration determined at the step 1817, therefore, the assumedly set resource amount C is discarded at step 1822, and the processing then proceeds to the next processing. As a result, the resource amount, which becomes maximum, is determined as a resource amount, among the assumedly set resource amount C.

(19) The simulation unit 115 calculates the resource amount extendable by the virtual server Y from an expression (resource amount C (refer to the step 1816)−resource amount A (refer to the step 1808)) to then output a calculated value, and the processing is terminated at step 1819.

According to the above-mentioned processing operations, the user of the pool can refer to the maximum resource amount of the virtual server addable to the resource pool 130 and the resource amount extendable by the virtual server 120 belonging to the resource pool 130, so that the resource amount of the virtual server 120 can easily be adjusted.

Figure 19:
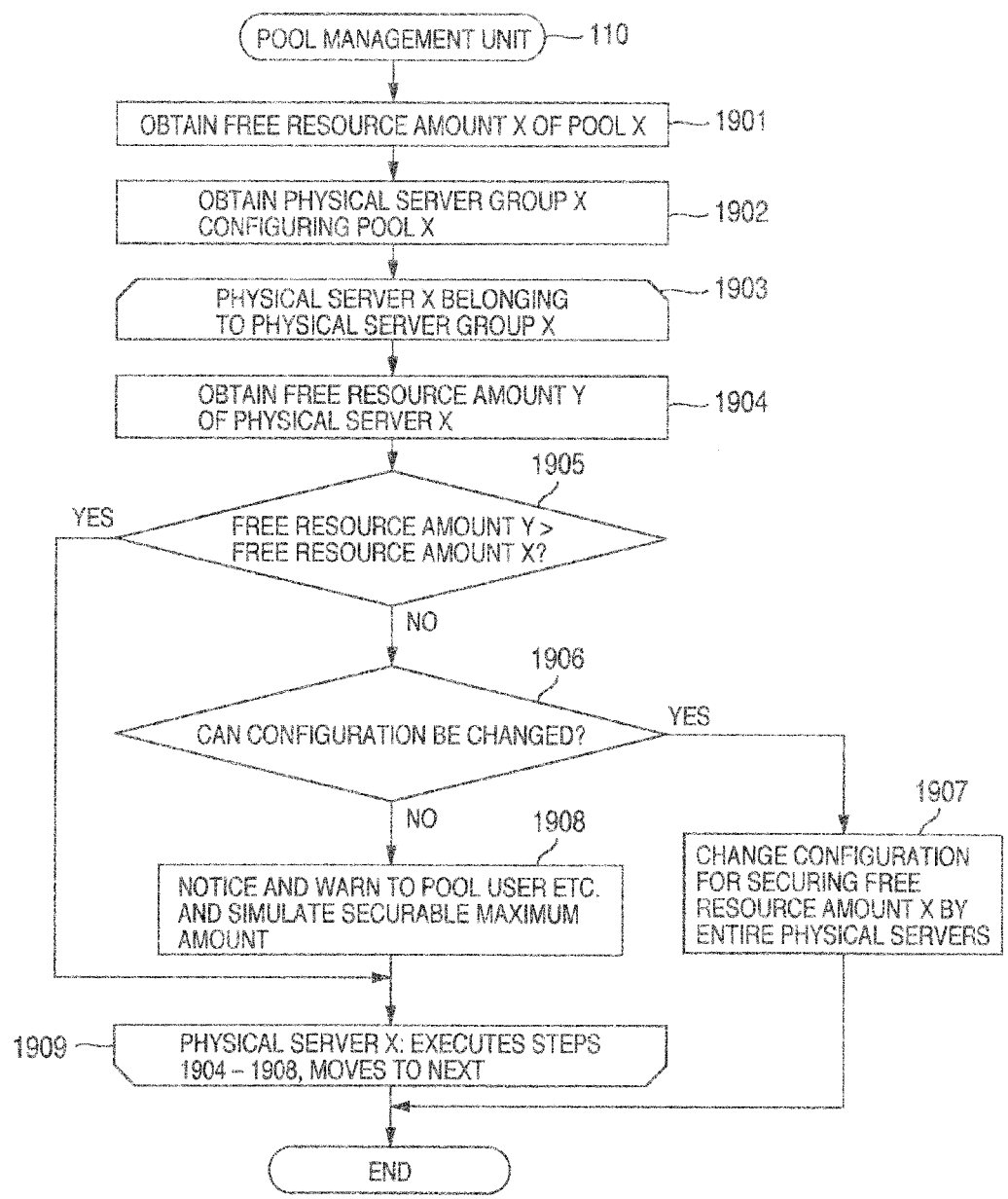
FIG. 19 is a flowchart of a processing operation of a pool management unit 110.

FIG. 19 is a flowchart showing a processing operation of the pool management unit 110.

(1) First, the pool management 110 obtains a free resource amount X of the pool X at step 1901.

(2) The pool management unit 110 obtains the physical server group X configuring the pool X at step 1902.

(3) The pool management unit 110 executes the processing from steps 1904 to 1908 for the physical server X belonging to the physical server group X at step 1903.

After executing processing at steps 1904 to step 1908 for all the physical server X belonging to the physical server group X, then moves onto the next step.

(4) The pool management unit 110 obtains a free resource amount Y of the physical server X at step 1904.

(5) The pool management 110 determines whether the free resource amount Y is larger than the free resource amount X at step 1905. If a processing result is larger at the determination as "Yes" at the step 1905, the processing proceeds to a step of the next physical server X at the step 1903. For example, when moving a certain virtual server, the virtual server may be moved to the physical server having a sufficient free resource amount Y equal to or greater than the free resource amount X of the pool X to be operated it therein. In this way, the resource of a movement source physical server for the virtual server is secured, so that the free resource of the pool configuring its physical server can be used effectively. The request of moving the virtual server is entered from the input device 208, for example.

(6) If the processing result is small at the determination as "No" at the step 1905, the pool management unit 110 determines whether a configuration can be varied at step 1906. In addition, what the configuration can be varied means that the physical server group, which could configure the resource pool 130, is varied, that is, the physical server group can be varied under a restriction derived from the performance information of the physical server, when the virtual server allocated the resource from the resource pool 130 is moved to the other physical server.

(7) If the determination indicates that the configuration can be varied as "Yes" at the step 1906, the pool management unit 110 executes the configuration variation for securing the free resource amount X by the entire physical server through the control unit 111 at step 1907. For example, in a certain physical server, if a sufficient resource free can be secured by allocating the resources (bit at a time) to the other physical servers, that resource free is secured. After the execution, a certain virtual server is moved to the physical server secured the resource free to then terminate the entire processing.

(8) If the determination indicates that the configuration cannot be varied as "No" at the step 1906, the pool management unit 110 notifies it to the user, administrator and the provider of the pool through the display unit 114. Further, a securable maximum amount is simulated through the simulation unit 115 to be displayed it through the display unit 114 at step 1908. After the display, the processing proceeds to the processing of the next physical server X at the step 1903.

FIG. 10 is a diagram showing the management of the resource pool 130 in the first embodiment of the invention.

A server group 1001 has a plurality of physical servers 104.

A certain resource pool 130 used by a pool user 1000 indicates a condition where it does not share the physical server 104 with the other resource pool, but occupies it. The virtual server 120 belonging to the resource pool 130 is operated on either one of the physical servers 104 configuring the resource pool 130. The plurality of virtual servers 120 may be operated on one physical server 104. Further, a resource free 1002 is obtained from subtracting the total of CPU allocation amount of the virtual servers 120 from the CPU total amount of the physical servers 104.

Figure 20:
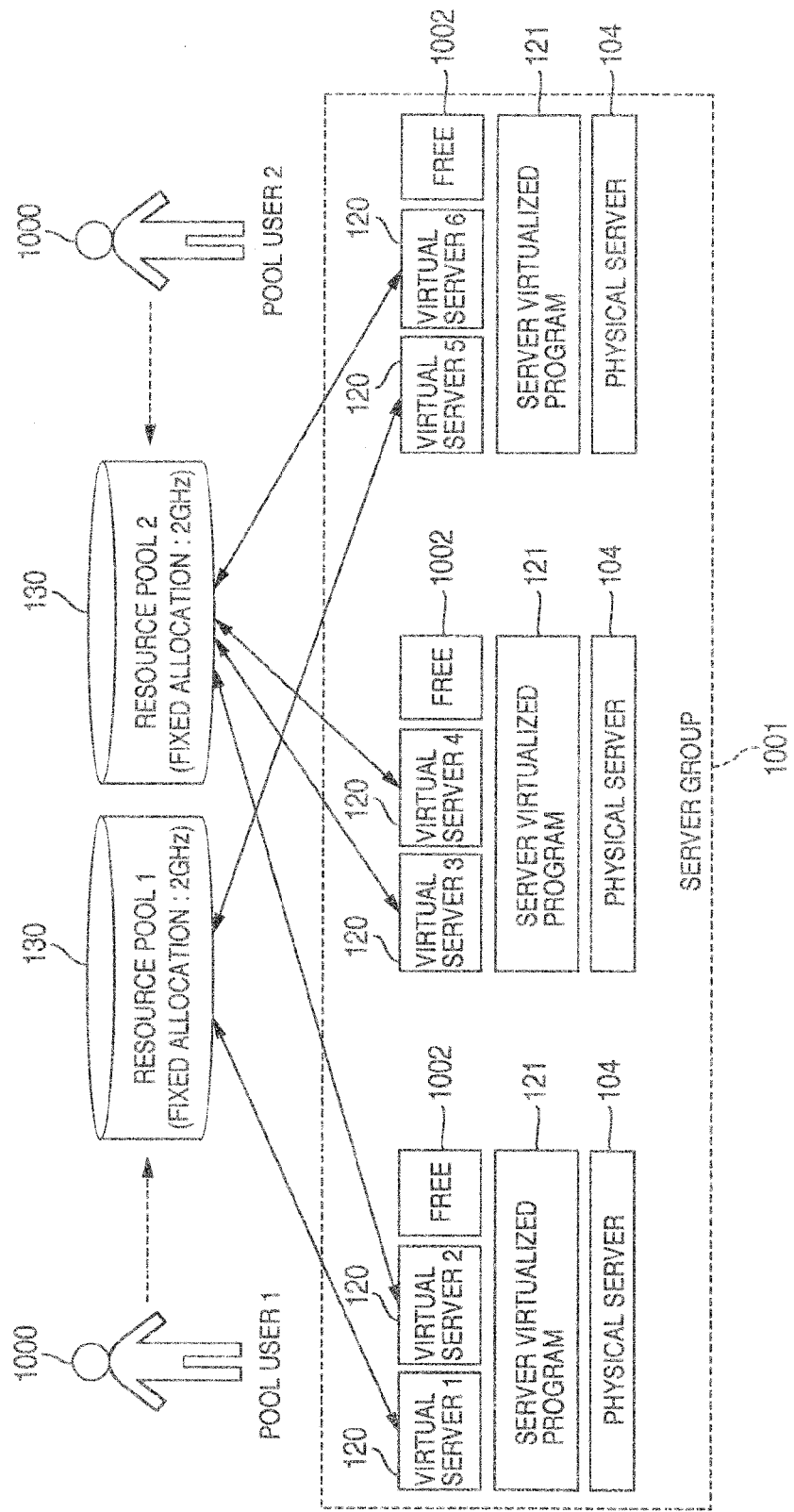
FIG. 20 is a diagram showing a size-fixed resource pool management in the first embodiment of the invention.

FIG. 20 is a diagram showing the management of the resource pool in the first embodiment of the invention. The configuring elements in FIG. 20 identical to those in FIG. 10 are appended with the same reference numerals.

A plurality of resource pools 1, 2 (130) share the physical servers 104. The size of resource pools 1, 2 (130) are fixed. A virtual server 1 (120) and virtual server 5 (120) are allocated to the resource pool 1 (130) to be used by a pool user 1 (1000). Further, a virtual serve 2 (120), virtual servers 3, 4 (120), and a virtual server 5 (120) are allocated to the resource pool 2 (130) to be used by a pool user 2 (1000).

Figure 21:
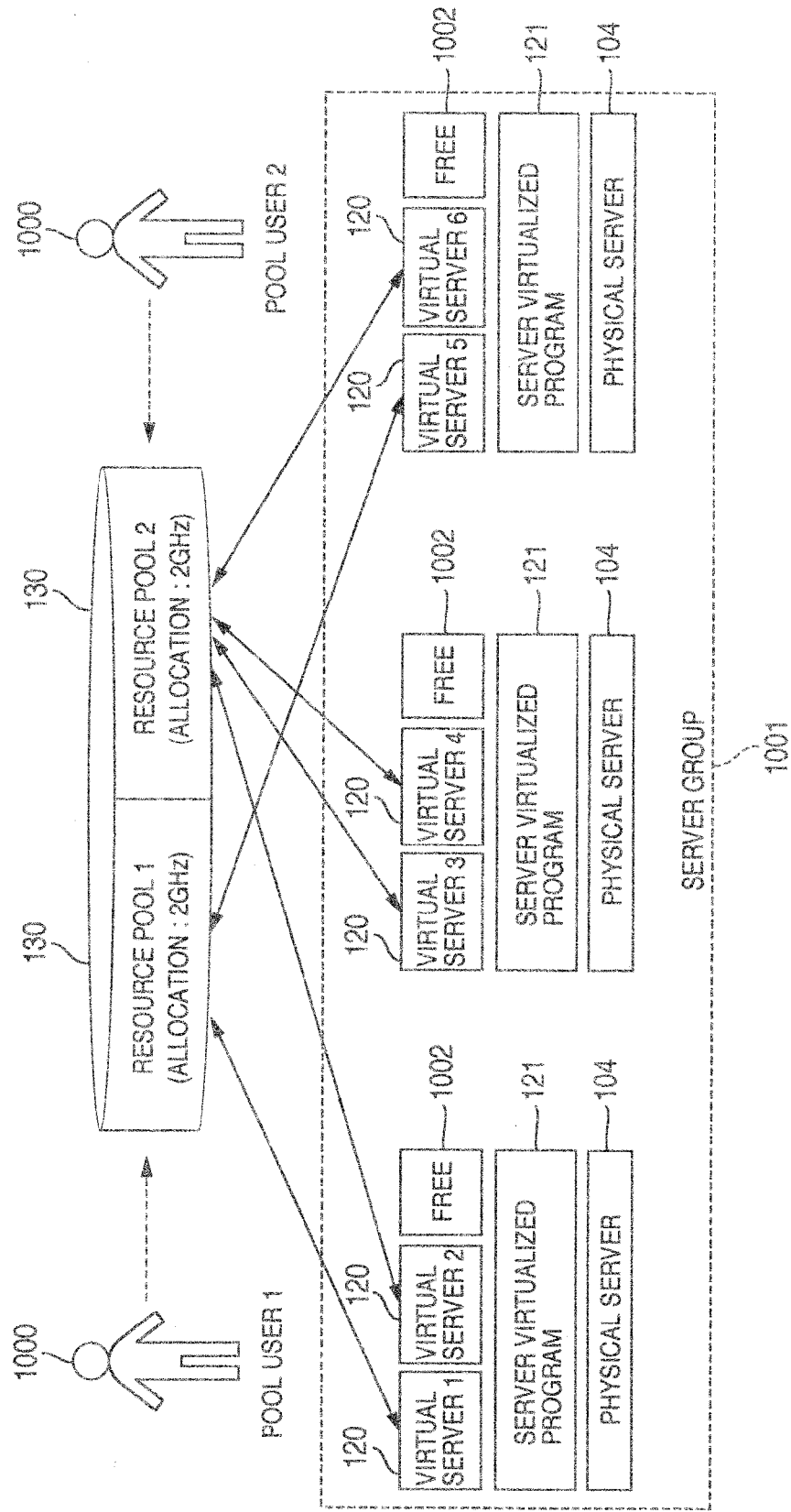
FIG. 21 is a diagram showing a size-varied resource pool management in the first embodiment of the invention.

FIG. 21 is a diagram showing the management of resource pool in the first embodiment of the invention. The configuring elements in FIG. 21 identical to those in FIG. 10 are appended with the same reference numerals.

A plurality of resource pools 130 share the physical servers 104. The size of the resource pool 130 is varied. The virtual serve 1 (120) and virtual server 5 (120) are allocated to the resource pool 1 (130) to be used by the pool user 1 (1000). Further, the virtual server 2 (120), virtual servers 3, 4 (120), and virtual server 5 (120) are allocated to the resource pool 2 (130) to be used by the pool user 2 (1000). The CPU allocation amount (2 GHz) of the resource pool 1 (1309) and the CPU allocation amount (2 GHz) of the resource pool 2 (130) can be varied in response to the operation of virtual server 120.

Second Embodiment

A second embodiment of the invention is different from the first embodiment in that the allocation of the CPU 202 to the virtual servers 120 is defined by the number of cores in the CPU.

The CPU 202 in this embodiment provides a plurality of cores. Each core can execute a program simultaneously. In the CPU 202 providing the plural cores, a unit of cores is allocated to the virtual server 120, which is rather high independency and efficient.

In addition, the configuring elements identical to the first embodiment are appended with the same reference numerals in this embodiment, and description for those is omitted.

FIG. 22 is a configuration diagram of the virtual server performance table 300 in this embodiment.

The virtual server performance table 300 provides the virtual server ID column 301 and a number of allocation cores column 2001.

The number of allocation cores column 2001 indicates the number of cores in the CPU 202 which becomes a unit to be allocated to the virtual server 120.

FIG. 23 is a configuration diagram of the physical server performance table 400 in this embodiment.

The physical server performance table 400 provides the physical server ID column 401, a total number of cores column 2301, a number of allocated cores column 2302, and a number of non-allocated cores column 2303.

The total number of cores column 2301 indicates the number of cores of the CPU 202 in the physical server 104. The number of allocated cores column 2302 is the number of cores of CPU 202 in the physical server 104, that is, the number of cores allocated to the virtual server 120 to be operated on the physical server 104.

The number of non-allocated cores column 2303 indicates the number of cores of the CPU 202 in the physical server 104, that is, the number of cores not to be allocated to any virtual server 120 to be operated on the physical server 104.

FIG. 24 is a configuration diagram of the pool performance table 500 in this embodiment.

The pool performance table 500 provides the pool ID column 501, a total number of cores column 2401, a number of allocated cores column 2402, and a number of non-allocated cores column 2403.

The total number of cores column 2401 indicates a total number of cores set in the resource pool 130. The total number of cores to be allocated to the virtual servers 120 belonging to the resource pool 130 should be less than the above-mentioned total number of cores.

The number of allocated cores column 2402 indicates a total number of cores allocated to the virtual servers 120 belonging to the resource pool 130.

The number of non-allocated cores column 2403 indicates a total number of cores, which are not allocated to any virtual server 120 belonging to the resource pool 130, usable by the virtual server 120 belonging to the resource pool 130 and by the virtual server 120 to be newly added to the resource pool 130.

In the first embodiment of the invention, the management method of the resource pool 130 has been described in consideration of the performance and the configuration of the physical server 104, as used with a unit of the operating clock frequency (Hz) in the CPU. However, in the second embodiment of the invention, the management method of the resource pool 130 can be realized in consideration of the performance and the configuration of the physical server 104 on the basis of the number of cores in the CPU 202, similarly to the first embodiment. The display unit 114 associates with the usage condition of the number of cores in the resource pool 130, the usage condition of the number of cores in the physical server 104 configuring the resource pool 130, and the usage condition of the number of cores in the virtual server 120 to be operated on the physical server 104 to be displayed on the display screen. Further, the pool management unit 110 varies a correspondence relation between the virtual server 120 and the physical server 104 to be able to provide with the number of non-allocated cores in the resource pool 130 to the virtual servers.

According to the second embodiment of the invention, the management of the resource pool 130 operated by the user, provider and administrator of the resource pool 130 is made easily. Particularly, the management can be executed in consideration of the configuration of the physical server 104.

A specific example will be described with reference to FIG. 22 to FIG. 24. Two cores as the number of free cores are present in the pool B (refer to a reference numeral 2403), however, only one core as the number of resource free is present respectively in the physical server A and physical server B both configuring the pool B (refer to a reference numeral 2303). Therefore, the processing determines that the virtual server 120 of the two cores can be added by assuming merely the number of non-allocated cores in the pool B (refer to a reference numeral 2001). However, practically, the virtual server 120 of the two cores cannot be added since the free core in the physical server 104 is short in the case of an actually stated configuration. Therefore, such condition being occurred can be reminded to the user, provider and administrator of the resource pool 130.

<<Other>> The above-mentioned embodiments are preferable, however, the invention is not limited thereto and various changes and modifications can be made without departing from the spirit of the invention.

For example, the resource management method of the resource pool in the embodiments is applicable not only to the information processing system configured by the physical servers and virtual servers operated on the physical server, but also to a storage system configured by physical volumes and virtual (logical) volumes created on the physical volume. That is, the resource management method in the embodiments is also applicable to the system configured by the physical device such as physical server and physical volume, and the virtual device such as virtual server and virtual volume.

In the case of storage system, certain virtual volumes can be resided simultaneously in a plurality of physical volumes, therefore, one virtual volume is configured by using a high performance and low performance physical volumes to thereby store files in the respective virtual volumes. The files are stored by a manner like this, the files are thereby sometimes stored practically either in the high performance physical volume or in the low performance physical volume, as the storage system is operated. For this reason, in the case where a read/write processing is executed when the files are being stored in the low performance physical volume, that processing speed is slow, therefore, an advantage of using the high performance physical volume cannot sometimes be effective in this case. In the invention, the physical volume can be monitored in using the resource pool, therefore, the files can be stored in the high physical volume as required. In consequence, the advantage of using the high performance physical volume can be effective.

Further, the program used for the resource management described above in the embodiments may be distributed to the users, who want to use it, with the program distributable on a network such as internet etc. A recording medium (for example, CD (Compact Disk) recording the program may be distributed to the user through a distribution route.

The display unit 114 in the embodiments may be controlled so as to display all or a part of the performance information and configuration information.

In the embodiments, the simulation unit 115 calculates the maximum resource amount of the virtual server addable to the pool and the maximum resource amount extendable by the virtual server (refer to FIGS. 16A to 16C and FIGS. 18A to 18C). However, these calculated resource amounts may not be necessarily the maximum (for example, a 60% amount of the maximum resource amount is calculated such that the operational performance of the virtual server becomes best.)

The specific configurations of the hardware, software, and processing in the respective flowcharts, etc. can be varied appropriately without departing from the spirit of the invention.

The invention is therefore applicable to the control regarding the allocation of the resources in the physical server, in the environment mixing with the physical servers, virtual servers and resource pools.

It should be further understood by those skilled in the art that although the foregoing description has been made on embodiments of the invention, the invention is not limited thereto and various changes and modifications may be made without departing from the spirit of the invention and the scope of the appended claims.

We claim:

1. A management computer for managing a plurality of physical computers, comprising:
   a storage storing a management program; and
   a CPU configured to execute the management program,
   wherein by executing the management program, the CPU processes to:
   (1) configure a first resource pool to manage a plurality of computer resources of the physical computers;
   (2) display an amount of free computer resources which is allocated to the first resource pool;
   (3) for at least one certain virtual server to which the computer resources managed by the first resource pool is allocated:
      (3a) identify a certain physical computer corresponding to the at least one certain virtual server;
      (3b) calculate an extendable amount of computer resources able to be allocated to the at least one certain virtual server by using a resource amount of the physical computer corresponding to the at least one certain virtual server; and
      (3c) display the extendable amount of computer resources.

2. A management computer according to claim 1, wherein the physical computer extends a computer resource allocated to the at least one certain virtual server.

3. A management computer according to claim 1, wherein the first amount of free computer resources in (2) and the extendable amount of computer resources in (3c) are displayed based on an input designating the first resource pool.

4. A management computer according to claim 3, wherein the amount of computer resources in (2) and the extendable amount of free computer resources in (3c) are displayed to a common screen.

5. A management computer according to claim 1, wherein the physical computer extends a computer resource allocated to the at least one certain virtual server, based on the workload of the at least one certain virtual server.

6. A management computer according to claim 1, wherein the at least one certain virtual server is migrated from a current physical computer currently corresponding to the at least one certain virtual server, to another physical computer, if the current physical computer has fewer free computer resources.

7. A non-transitory computer-readable medium encoded with computer-executable instructions that configure a processor on execution to:
   (1) configure a first resource pool to manage a plurality of computer resources of physical computers;
   (2) display an amount of free computer resources which is allocated the first resource pool;
   (3) for at least one certain virtual server to which the computer resources managed by the first resource pool is allocated:
      (3a) identify a certain physical computer corresponding to the at least one certain virtual server;
      (3b) calculate an extendable amount of computer resources able to be allocated to the at least one certain virtual server by using a resource amount of the physical computer corresponding to the at least one certain virtual server; and
      (3c) display the extendable amount of computer resources.

8. A non-transitory computer-readable medium according to claim 7,
   wherein the computer-executable instructions further configure the processor to display a computer resource extended by the physical computer to be allocated to the at least one certain virtual server.

9. A non-transitory computer-readable medium according to claim 7,
   wherein the amount of free computer resources in (2) and the extendable amount of computer resources in (3c) are displayed based on an input designating the first resource pool.

10. A non-transitory computer-readable medium according to claim 9,
    wherein the amount of computer resources in (2) and the extendable amount of free computer resources in (3c) are displayed to a common screen.

11. A non-transitory computer-readable medium according to claim 7,
    wherein the computer-executable instructions further configure the processor to display a computer resource extended by the physical computer to be allocated to the at least one certain virtual server, based on the workload of the at least one certain virtual server.

12. A non-transitory computer-readable medium according to claim 7,
    wherein the computer-executable instructions further configure the processor to migrate the at least one certain virtual server from a current physical computer currently corresponding to the at least one certain virtual server, to another physical computer, if the current physical computer has fewer free computer resources.

13. A storage system comprising:
    a plurality of physical computers, and
    a management computer for managing the plurality of physical computers,
    wherein the management computer comprises:
       a storage storing a management program; and
       a CPU configured to execute the management program,
       wherein by executing the management program, the CPU processes to:
       (1) configure a first resource pool to manage a plurality of computer resources of the physical computers;
       (2) display an amount of free computer resources which is allocated to the first resource pool;
       (3) for at least one certain virtual server to which the computer resources managed by the first resource pool is allocated:
          (3a) identify a certain physical computer corresponding to the at least one certain virtual server;
          (3b) calculate an extendable amount of computer resources able to be allocated to the at least one certain virtual server by using a resource amount of the physical computer corresponding to the at least one certain virtual server; and (3c) display the extendable amount of computer resources.

14. A storage system according to claim 13,
wherein the physical computer extends a computer resource allocated to the at least one certain virtual server.

15. A storage system according to claim 13,
wherein the amount of free computer resources in (2) and the extendable amount of computer resources in (3c) are displayed based on an input designating the first resource pool.

16. A storage system according to claim 15,
wherein the amount of computer resources in (2) and the extendable amount of free computer resources in (3c) are displayed to a common screen.

17. A storage system according to claim 13,
wherein the physical computer extends a computer resource allocated to the at least one certain virtual server, based on the workload of the at least one certain virtual server.

18. A storage system according to claim 13,
wherein the at least one certain virtual server is migrated from a current physical computer currently corresponding to the at least one certain virtual server, to another physical computer, if the current physical computer has fewer free computer resources.

* * * * *